(12) United States Patent
Khare et al.

(10) Patent No.: US 12,341,748 B2
(45) Date of Patent: Jun. 24, 2025

(54) APPARATUS, METHODS, AND COMPUTER PROGRAMS

(71) Applicant: NOKIA TECHNOLOGIES OY, Espoo (FI)

(72) Inventors: Saurabh Khare, Bangalore (IN); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/982,183

(22) Filed: Nov. 7, 2022

(65) Prior Publication Data
US 2023/0148200 A1 May 11, 2023

(30) Foreign Application Priority Data
Nov. 5, 2021 (IN) .............................. 202141050757

(51) Int. Cl.
| | |
|---|---|
| *G06F 15/16* | (2006.01) |
| *H04L 61/45* | (2022.01) |
| *H04L 61/5076* | (2022.01) |
| *H04L 67/55* | (2022.01) |

(52) U.S. Cl.
CPC .......... *H04L 61/5076* (2022.05); *H04L 61/45* (2022.05); *H04L 67/55* (2022.05)

(58) Field of Classification Search
CPC ...... H04L 61/5076; H04L 61/45; H04L 67/55
USPC .................. 709/202–203, 238–239, 245–246
See application file for complete search history.

(56) References Cited

U.S. PATENT DOCUMENTS

| | | | | |
|---|---|---|---|---|
| 11,425,553 | B2* | 8/2022 | Wiehe | H04W 8/04 |
| 11,930,083 | B2* | 3/2024 | Goel | H04L 67/51 |
| 11,930,394 | B2* | 3/2024 | Landais | H04L 67/1008 |
| 12,052,659 | B2* | 7/2024 | Hallenstål | H04L 41/122 |
| 2013/0010636 | A1* | 1/2013 | Regula | H04L 49/45 370/254 |
| 2013/0297824 | A1* | 11/2013 | Lan | H04L 61/5007 709/238 |
| 2014/0192717 | A1* | 7/2014 | Liu | H04L 67/51 370/328 |
| 2022/0124468 | A1* | 4/2022 | Lu | H04L 67/56 |
| 2022/0159464 | A1* | 5/2022 | Rajput | H04W 48/08 |

(Continued)

OTHER PUBLICATIONS

Extended European Search Report dated Mar. 13, 2023, corresponding to European Patent Application No. 22205468.6.

(Continued)

*Primary Examiner* — Bharat Barot
(74) *Attorney, Agent, or Firm* — SQUIRE PATTON BOGGS (US) LLP

(57) ABSTRACT

There is provided a method, computer program, and an apparatus for a network function that causes the network function to: receive, from a service consumer, event subscription information comprising an intra-domain address and an inter-domain address for signalling event subscription notification information from a service producer to the service consumer; determine whether a first service producer is located in the same domain as the service consumer; select at least one of the inter-domain address and the intra-domain address to signal to the first service producer in dependence on said determining; and signal the selected at least one address to the first service producer.

13 Claims, 10 Drawing Sheets

(56) References Cited

U.S. PATENT DOCUMENTS

2022/0232460 A1* 7/2022 Fu .................... H04L 63/123

OTHER PUBLICATIONS

Nokia et al: "Subscription via intermediate NFs/UDM", 3GPP Draft, C4-215193, Oct. 1, 2021.
"3rd Generation Partnership Project; Technical Specification Group Core Network and Terminals; 5G System; Technical Realization of Service Based Architecture; Stage 3 (Release 17)", 3GPP Standard TS 29.500, No. V17.4.0. Sep. 16, 2021.
"3rd Generation Partnership Project; Technical Specification Group Core Network and Terminals; 5G System; Principles and Guidelines for Services Definition; Stage 3 (Release 17)", 3GPP Standard TS 29.501, No. V17.3.1, Sep. 21, 2021.
"3rd Generation Partnership Project; Technical Specification Group Core Network and Terminals; Numbering, addressing and identification; (Release 17)", 3GPP Standard TS 23.003, No. V17.3.0, Sep. 16, 2021.

* cited by examiner

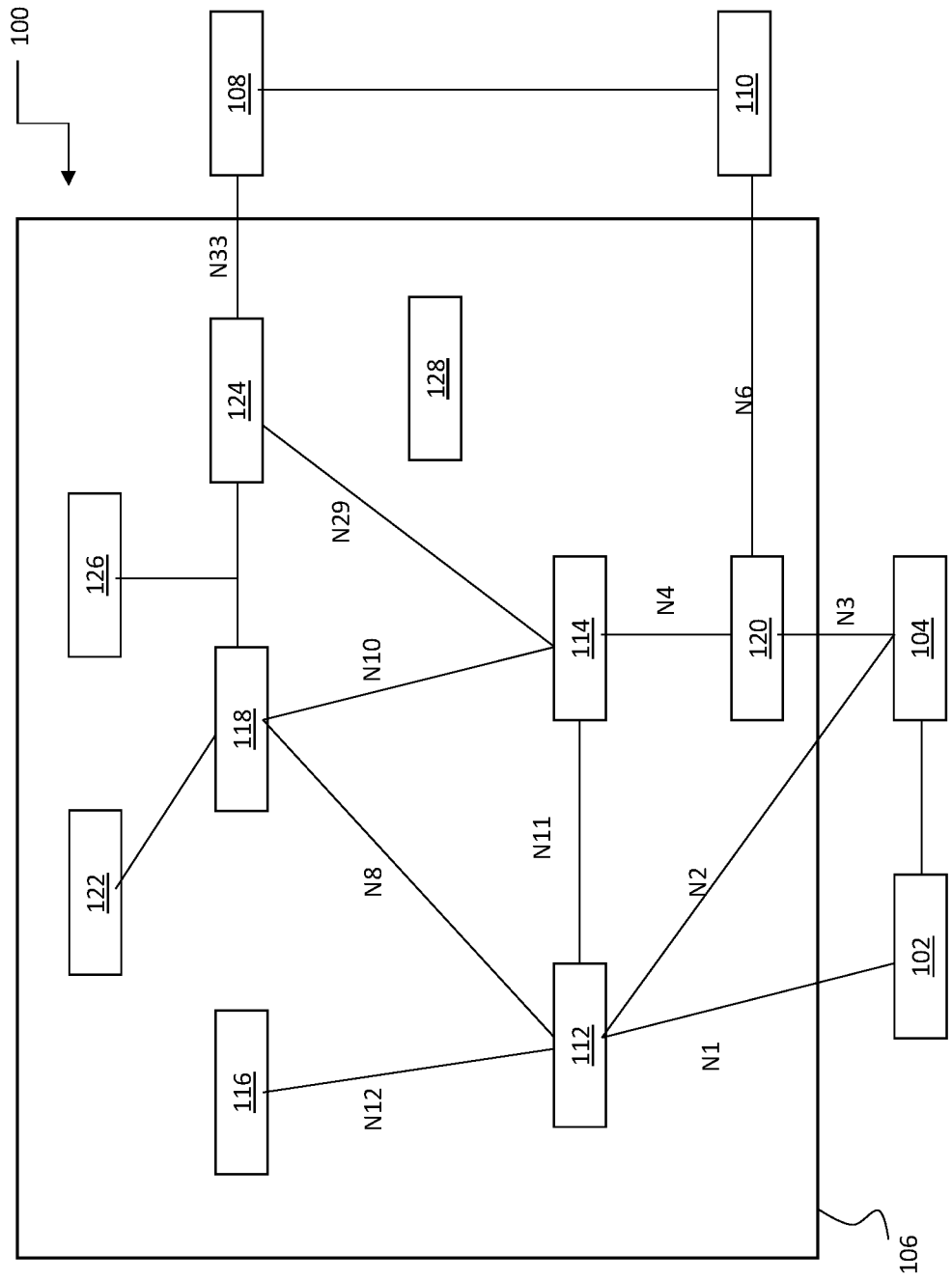

APPARATUS, METHODS, AND COMPUTER PROGRAMS

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for a network function, the apparatus comprising means for: receiving, from a service consumer, event subscription information comprising an intra-domain address and an inter-domain address for signalling event subscription notification information from a service producer to the service consumer; determining whether a first service producer is located in the same domain as the service consumer; selecting at least one of the inter-domain address and the intra-domain address to signal to the first service producer in dependence on said determining; and signalling the selected at least one address to the first service producer.

The apparatus may comprise means for determining whether the first service producer is configured to receive both the intra-domain address and the inter-domain address.

The means for selecting may comprise means for selecting both the inter-domain address and the intra-domain address for signaling to the first service producer when it is determined that the first service producer is configured to receive both the intra-domain address and the inter-domain address.

The means for selecting may comprise means for selecting one of the inter-domain address and the intra-domain address for signaling to the first service producer when it is determined that the first service producer is not configured to receive both the intra-domain address and the inter-domain address, wherein the intra-domain address is selected when it is determined that the first service producer is located in the same domain as the service consumer, and the inter-domain address is selected when it is determined that the first service producer is located in a different domain to the service consumer.

The means for selecting may comprise means for selecting one of the inter-domain address and the intra-domain address as an endpoint for at least one event subscription notification from the service producer in dependence on whether the service consumer is in the same domain or a different domain to the first service consumer; and the means for signalling may comprise means for: signalling both the inter-domain address and the intra-domain address for signaling to the first service producer; and signalling an indication of which of the inter-domain address and the intra-domain address has been selected as an endpoint.

The means for selecting may comprise means for selecting one of the inter-domain address and the intra-domain address as an endpoint for at least one event subscription notification from the service producer in dependence on whether the service consumer is in the same domain or a different domain to the first service consumer; and the means for signalling may comprise means for: signalling only the selected one of the inter-domain address and the intra-domain address to the first service producer.

The received event subscription information may indicate one of the intra-domain address and the inter-domain address is to function as an endpoint for at least one event subscription notification for the service consumer, and wherein the means for selecting may further comprise means for: determining that the received indicated endpoint address is incompatible with the relative domain locations of the first service producer and the service consumer; and in response to said determining, overwriting the indicated endpoint address to instead indicate the other of said addresses.

The network function may be one of a unified data management function and a data collection coordination function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a second aspect, there is provided an apparatus for a service consumer, the apparatus comprising means for: signalling, to a network function, event subscription information comprising an intra-domain address and an inter-domain address for signalling event subscription notification information from a service producer to the service consumer; and receiving, at least one of an event subscription notification addressed from a first service producer in the same domain as the apparatus to the intra-domain address, and an event subscription notification addressed from a second service producer in a different domain than the apparatus to the inter-domain address.

The service consumer may be a network exposure function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a third aspect, there is provided an apparatus for a first service producer, the apparatus comprising means for: receiving, from a network function, event subscription information comprising an intra-domain address and an inter-domain address for addressing event subscription notification information to a service consumer; selecting an address from the intra-domain address and the inter-domain address for addressing notification information to the service consumer, wherein the intra-domain address is selected when the first service producer is located in the same domain as the service consumer, and wherein the inter-domain address is selected when the first service producer is located in a different domain to the service consumer; and signalling notification information to the service consumer using the selected address.

The apparatus may comprise means for: determining that event subscription notification information for the service consumer is to be provided by a second service producer; and signalling both the inter-domain address and the inter-domain address to the second service producer in response to said determining that event subscription notification information for the service consumer is to be provided by a second service producer.

The apparatus may comprise means for: determining that event subscription notification information for the service consumer is to be provided by a second service producer; determining whether the second service producer is located in a same or a different domain as the service consumer; selecting one of the inter-domain address and the inter-domain address to the second service producer in response to said determining whether the second service producer is located in a same or a different domain as the service consumer, wherein the intra-domain address is selected when it is determined that the second service producer is located in the same domain as the service consumer, and the inter-domain address is selected when it is determined that the second service producer is located in a different domain to the service consumer; and signalling the selected address to the second service producer.

The apparatus may comprise means for: determining that event subscription notification information for the service consumer is to be provided by a second service producer; determining that the second service producer is able to receive both the intra-domain address and the inter-domain address; and signalling both the inter-domain address and the inter-domain address to the second service producer in response to said determining that the second service producer is able to receive both the intra-domain address and the inter-domain address.

The apparatus may comprise means for: determining that event subscription notification information for the service consumer is to be provided by a second service producer; determining that the second service producer is unable to receive both the intra-domain address and the inter-domain address; and signalling one of the inter-domain address and the inter-domain address to the second service producer in response to said determining that the second service producer is unable to receive both the intra-domain address and the inter-domain address, wherein the intra-domain address is signalled to the second service producer when the second service producer is determined to be located in the same domain as the service consumer, and wherein the inter-domain address is selected when the second service producer is determined to be located in a different domain to the service consumer.

The apparatus may comprise means for: determining that event subscription notification information for the service consumer is to be provided by a second service producer; determining that the second service producer is unable to receive both the intra-domain address and the inter-domain address; and cancelling the subscription associated with the event subscription notification information in response to said determining that the second service producer is unable to receive both the intra-domain address and the inter-domain address.

The received event subscription information may indicate one of the intra-domain address and the inter-domain address is to function as an endpoint for at least one event subscription notification for the service consumer, and wherein the means for selecting may further comprise means for: determining that the received indicated endpoint address is incompatible with the relative domain locations of the second service producer and the service consumer; and in response to said determining, overwriting the indicated endpoint address to instead indicate the other of said addresses.

The first service producer may be an access and mobility function and/or a session management function.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a fourth aspect, there is provided an apparatus for a network function, the apparatus comprising: at least one processor; and at least one memory comprising computer code that, when executed by the at least one processor, causes the apparatus to: receive, from a service consumer, event subscription information comprising an intra-domain address and an inter-domain address for signalling event subscription notification information from a service producer to the service consumer; determine whether a first service producer is located in the same domain as the service consumer; select at least one of the inter-domain address and the intra-domain address to signal to the first service producer in dependence on said determining; and signal the selected at least one address to the first service producer.

The apparatus may be caused to: determine whether the first service producer is configured to receive both the intra-domain address and the inter-domain address.

The selecting may comprise selecting both the inter-domain address and the intra-domain address for signaling to the first service producer when it is determined that the first service producer is configured to receive both the intra-domain address and the inter-domain address.

The selecting may comprise selecting one of the inter-domain address and the intra-domain address for signaling to the first service producer when it is determined that the first service producer is not configured to receive both the intra-domain address and the inter-domain address, wherein the intra-domain address is selected when it is determined that the first service producer is located in the same domain as the service consumer, and the inter-domain address is selected when it is determined that the first service producer is located in a different domain to the service consumer.

The selecting may comprise selecting one of the inter-domain address and the intra-domain address as an endpoint for at least one event subscription notification from the service producer in dependence on whether the service consumer is in the same domain or a different domain to the first service consumer; and the signalling may comprise: signalling both the inter-domain address and the intra-domain address for signaling to the first service producer; and signalling an indication of which of the inter-domain address and the intra-domain address has been selected as an endpoint.

The selecting may comprise selecting one of the inter-domain address and the intra-domain address as an endpoint for at least one event subscription notification from the service producer in dependence on whether the service consumer is in the same domain or a different domain to the first service consumer; and the signalling may comprise: signalling only the selected one of the inter-domain address and the intra-domain address to the first service producer.

The received event subscription information may indicate one of the intra-domain address and the inter-domain address is to function as an endpoint for at least one event subscription notification for the service consumer, and wherein the selecting may further comprise: determining that the received indicated endpoint address is incompatible with the relative domain locations of the first service producer and the service consumer; and in response to said determining, overwriting the indicated endpoint address to instead indicate the other of said addresses.

The network function may be one of a unified data management function and a data collection coordination function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a fifth aspect, there is provided an apparatus for a service consumer, the apparatus comprising: at least one processor; and at least one memory comprising computer code that, when executed by the at least one processor, causes the apparatus to: signal, to a network function, event subscription information comprising an intra-domain address and an inter-domain address for signalling event subscription notification information from a service producer to the service consumer; and receive, at least one of an event subscription notification addressed from a first service producer in the same domain as the apparatus to the intra-domain address, and an event subscription notification addressed from a second service producer in a different domain than the apparatus to the inter-domain address.

The service consumer may be a network exposure function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a sixth aspect, there is provided an apparatus for a first service producer, the apparatus comprising: at least one processor; and at least one memory comprising computer code that, when executed by the at least one processor, causes the apparatus to: receive, from a network function, event subscription information comprising an intra-domain address and an inter-domain address for addressing event subscription notification information to a service consumer; select an address from the intra-domain address and the inter-domain address for addressing notification information to the service consumer, wherein the intra-domain address is selected when the first service producer is located in the same domain as the service consumer, and wherein the inter-domain address is selected when the first service producer is located in a different domain to the service consumer; and signal notification information to the service consumer using the selected address.

The apparatus may be caused to: determine that event subscription notification information for the service consumer is to be provided by a second service producer; and signal both the inter-domain address and the inter-domain address to the second service producer in response to said determining that event subscription notification information for the service consumer is to be provided by a second service producer.

The apparatus may be caused to: determine that event subscription notification information for the service consumer is to be provided by a second service producer; determining whether the second service producer is located in a same or a different domain as the service consumer; select one of the inter-domain address and the inter-domain address to the second service producer in response to said determining whether the second service producer is located in a same or a different domain as the service consumer, wherein the intra-domain address is selected when it is determined that the second service producer is located in the same domain as the service consumer, and the inter-domain address is selected when it is determined that the second service producer is located in a different domain to the service consumer; and signal the selected address to the second service producer.

The apparatus may be caused to: determine that event subscription notification information for the service consumer is to be provided by a second service producer; determining that the second service producer is able to receive both the intra-domain address and the inter-domain address; and signal both the inter-domain address and the inter-domain address to the second service producer in response to said determining that the second service producer is able to receive both the intra-domain address and the inter-domain address.

The apparatus may be caused to: determine that event subscription notification information for the service consumer is to be provided by a second service producer; determine that the second service producer is unable to receive both the intra-domain address and the inter-domain address; and signal one of the inter-domain address and the inter-domain address to the second service producer in response to said determining that the second service producer is unable to receive both the intra-domain address and the inter-domain address, wherein the intra-domain address is signalled to the second service producer when the second service producer is determined to be located in the same domain as the service consumer, and wherein the inter-domain address is selected when the second service producer is determined to be located in a different domain to the service consumer.

The apparatus may be caused to: determine that event subscription notification information for the service consumer is to be provided by a second service producer; determining that the second service producer is unable to receive both the intra-domain address and the inter-domain address; and cancel the subscription associated with the event subscription notification information in response to said determining that the second service producer is unable to receive both the intra-domain address and the inter-domain address.

The received event subscription information may indicate one of the intra-domain address and the inter-domain address is to function as an endpoint for at least one event subscription notification for the service consumer, and wherein the selecting may further comprise: determining that the received indicated endpoint address is incompatible with the relative domain locations of the second service producer and the service consumer; and in response to said determining, overwriting the indicated endpoint address to instead indicate the other of said addresses.

The first service producer may be an access and mobility function and/or a session management function.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a seventh aspect, there is provided a method for an apparatus for a network function, the method comprising: receiving, from a service consumer, event subscription information comprising an intra-domain address and an inter-domain address for signalling event subscription notification information from a service producer to the service consumer; determining whether a first service producer is located in the same domain as the service consumer; selecting at least one of the inter-domain address and the intra-domain address to signal to the first service producer in dependence on said determining; and signalling the selected at least one address to the first service producer.

The method may comprise: determining whether the first service producer is configured to receive both the intra-domain address and the inter-domain address.

The selecting may comprise selecting both the inter-domain address and the intra-domain address for signaling to the first service producer when it is determined that the first service producer is configured to receive both the intra-domain address and the inter-domain address.

The selecting may comprise selecting one of the inter-domain address and the intra-domain address for signaling to the first service producer when it is determined that the first service producer is not configured to receive both the intra-domain address and the inter-domain address, wherein the intra-domain address is selected when it is determined that the first service producer is located in the same domain as the service consumer, and the inter-domain address is selected when it is determined that the first service producer is located in a different domain to the service consumer.

The selecting may comprise selecting one of the inter-domain address and the intra-domain address as an endpoint for at least one event subscription notification from the service producer in dependence on whether the service consumer is in the same domain or a different domain to the first service consumer; and the signalling may comprise: signalling both the inter-domain address and the intra-domain address for signaling to the first service producer; and signalling an indication of which of the inter-domain address and the intra-domain address has been selected as an endpoint.

The selecting may comprise selecting one of the inter-domain address and the intra-domain address as an endpoint for at least one event subscription notification from the service producer in dependence on whether the service consumer is in the same domain or a different domain to the first service consumer; and the signalling may comprise: signalling only the selected one of the inter-domain address and the intra-domain address to the first service producer.

The received event subscription information may indicate one of the intra-domain address and the inter-domain address is to function as an endpoint for at least one event subscription notification for the service consumer, and wherein the selecting may further comprise: determining that the received indicated endpoint address is incompatible with the relative domain locations of the first service producer and the service consumer; and in response to said determining, overwriting the indicated endpoint address to instead indicate the other of said addresses.

The network function may be one of a unified data management function and a data collection coordination function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to an eighth aspect, there is provided a method for an apparatus for a service consumer, the method comprising: signalling, to a network function, event subscription information comprising an intra-domain address and an inter-domain address for signalling event subscription notification information from a service producer to the service consumer; and receiving, at least one of an event subscription notification addressed from a first service producer in the same domain as the apparatus to the intra-domain address, and an event subscription notification addressed from a second service producer in a different domain than the apparatus to the inter-domain address.

The service consumer may be a network exposure function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a ninth aspect, there is provided a method for an apparatus for a first service producer, the method comprising: receiving, from a network function, event subscription information comprising an intra-domain address and an inter-domain address for addressing event subscription notification information to a service consumer; selecting an address from the intra-domain address and the inter-domain address for addressing notification information to the service consumer, wherein the intra-domain address is selected when the first service producer is located in the same domain as the service consumer, and wherein the inter-domain address is selected when the first service producer is located in a different domain to the service consumer; and signalling notification information to the service consumer using the selected address.

The method may comprise: determining that event subscription notification information for the service consumer is to be provided by a second service producer; and signalling both the inter-domain address and the inter-domain address to the second service producer in response to said determining that event subscription notification information for the service consumer is to be provided by a second service producer.

The method may comprise: determining that event subscription notification information for the service consumer is to be provided by a second service producer; determining whether the second service producer is located in a same or a different domain as the service consumer; selecting one of the inter-domain address and the inter-domain address to the second service producer in response to said determining whether the second service producer is located in a same or a different domain as the service consumer, wherein the intra-domain address is selected when it is determined that the second service producer is located in the same domain as the service consumer, and the inter-domain address is selected when it is determined that the second service producer is located in a different domain to the service consumer; and signalling the selected address to the second service producer.

The method may comprise: determining that event subscription notification information for the service consumer is to be provided by a second service producer; determining that the second service producer is able to receive both the intra-domain address and the inter-domain address; and signalling both the inter-domain address and the inter-domain address to the second service producer in response to said determining that the second service producer is able to receive both the intra-domain address and the inter-domain address.

The method may comprise: determining that event subscription notification information for the service consumer is to be provided by a second service producer; determining that the second service producer is unable to receive both the intra-domain address and the inter-domain address; and signalling one of the inter-domain address and the inter-domain address to the second service producer in response to said determining that the second service producer is unable to receive both the intra-domain address and the inter-domain address, wherein the intra-domain address is signalled to the second service producer when the second service producer is determined to be located in the same domain as the service consumer, and wherein the inter-domain address is selected when the second service producer is determined to be located in a different domain to the service consumer.

The method may comprise: determining that event subscription notification information for the service consumer is to be provided by a second service producer; determining that the second service producer is unable to receive both the intra-domain address and the inter-domain address; and cancelling the subscription associated with the event subscription notification information in response to said determining that the second service producer is unable to receive both the intra-domain address and the inter-domain address.

The received event subscription information may indicate one of the intra-domain address and the inter-domain address is to function as an endpoint for at least one event subscription notification for the service consumer, and wherein the selecting may further comprise: determining that the received indicated endpoint address is incompatible with the relative domain locations of the second service producer and the service consumer; and in response to said determining, overwriting the indicated endpoint address to instead indicate the other of said addresses.

The first service producer may be an access and mobility function and/or a session management function.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address. According to a tenth aspect, there is provided an apparatus for a network function, the apparatus comprising: receiving circuitry for receiving, from a service consumer, event subscription information comprising an intra-domain address and an inter-domain address for signalling event subscription notification information from a service producer to the service consumer; determining circuitry for determining whether a first service producer is located in the same domain as the service consumer; selecting circuitry for selecting at least one of the inter-domain address and the intra-domain address to signal to the first service producer in dependence on said determining; and signalling circuitry for signalling the selected at least one address to the first service producer.

The apparatus may comprise determining circuitry for determining whether the first service producer is configured to receive both the intra-domain address and the inter-domain address.

The selecting circuitry for selecting may comprise selecting circuitry for selecting both the inter-domain address and the intra-domain address for signaling to the first service producer when it is determined that the first service producer is configured to receive both the intra-domain address and the inter-domain address.

The selecting circuitry for selecting may comprise selecting circuitry for selecting one of the inter-domain address and the intra-domain address for signaling to the first service producer when it is determined that the first service producer is not configured to receive both the intra-domain address and the inter-domain address, wherein the intra-domain address is selected when it is determined that the first service producer is located in the same domain as the service consumer, and the inter-domain address is selected when it is determined that the first service producer is located in a different domain to the service consumer.

The selecting circuitry for selecting may comprise selecting circuitry for selecting one of the inter-domain address and the intra-domain address as an endpoint for at least one event subscription notification from the service producer in dependence on whether the service consumer is in the same domain or a different domain to the first service consumer; and the signalling circuitry for signalling may comprise: signalling circuitry for signalling both the inter-domain address and the intra-domain address for signaling to the first service producer; and signalling circuitry signalling an indication of which of the inter-domain address and the intra-domain address has been selected as an endpoint.

The selecting circuitry for selecting may comprise selecting circuitry for selecting one of the inter-domain address and the intra-domain address as an endpoint for at least one event subscription notification from the service producer in dependence on whether the service consumer is in the same domain or a different domain to the first service consumer; and the signalling circuitry for signalling may comprise: signalling circuitry for signalling only the selected one of the inter-domain address and the intra-domain address to the first service producer.

The received event subscription information may indicate one of the intra-domain address and the inter-domain address is to function as an endpoint for at least one event subscription notification for the service consumer, and wherein the selecting circuitry for selecting may further comprise: determining circuitry for determining that the received indicated endpoint address is incompatible with the relative domain locations of the first service producer and the service consumer; and overwiring circuitry for, in response to said determining, overwriting the indicated endpoint address to instead indicate the other of said addresses.

The network function may be one of a unified data management function and a data collection coordination function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to an eleventh aspect, there is provided an apparatus for a service consumer, the apparatus comprising: signalling circuitry for signalling, to a network function, event subscription information comprising an intra-domain address and an inter-domain address for signalling event subscription notification information from a service producer to the service consumer; and receiving circuitry for receiving, at least one of an event subscription notification addressed from a first service producer in the same domain as the apparatus to the intra-domain address, and an event subscription notification addressed from a second service producer in a different domain than the apparatus to the inter-domain address.

The service consumer may be a network exposure function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a twelfth aspect, there is provided an apparatus for a first service producer, the apparatus comprising: receiving circuitry for receiving, from a network function, event subscription information comprising an intra-domain address and an inter-domain address for addressing event subscription notification information to a service consumer; selecting circuitry for selecting an address from the intra-domain address and the inter-domain address for addressing notification information to the service consumer, wherein the intra-domain address is selected when the first service producer is located in the same domain as the service consumer, and wherein the inter-domain address is selected when the first service producer is located in a different domain to the service consumer; and signalling circuitry for signalling notification information to the service consumer using the selected address.

The apparatus may comprise: determining circuitry for determining that event subscription notification information for the service consumer is to be provided by a second service producer; and signalling circuitry for signalling both the inter-domain address and the inter-domain address to the second service producer in response to said determining that event subscription notification information for the service consumer is to be provided by a second service producer.

The apparatus may comprise: determining circuitry for determining that event subscription notification information for the service consumer is to be provided by a second service producer; determining circuitry for determining whether the second service producer is located in a same or a different domain as the service consumer; selecting one of the inter-domain address and the inter-domain address to the second service producer in response to said determining whether the second service producer is located in a same or a different domain as the service consumer, wherein the intra-domain address is selected when it is determined that the second service producer is located in the same domain as the service consumer, and the inter-domain address is selected when it is determined that the second service producer is located in a different domain to the service consumer; and signalling circuitry for signalling the selected address to the second service producer.

The apparatus may comprise: determining circuitry for determining that event subscription notification information for the service consumer is to be provided by a second service producer; determining circuitry for determining that the second service producer is able to receive both the intra-domain address and the inter-domain address; and signalling circuitry for signalling both the inter-domain address and the inter-domain address to the second service producer in response to said determining that the second service producer is able to receive both the intra-domain address and the inter-domain address.

The apparatus may comprise: determining circuitry for determining that event subscription notification information for the service consumer is to be provided by a second service producer; determining circuitry for determining that the second service producer is unable to receive both the intra-domain address and the inter-domain address; and signalling circuitry for signalling one of the inter-domain address and the inter-domain address to the second service producer in response to said determining that the second service producer is unable to receive both the intra-domain address and the inter-domain address, wherein the intra-domain address is signalled to the second service producer when the second service producer is determined to be located in the same domain as the service consumer, and wherein the inter-domain address is selected when the second service producer is determined to be located in a different domain to the service consumer.

The apparatus may comprise: determining circuitry for determining that event subscription notification information for the service consumer is to be provided by a second service producer; determining circuitry for determining that the second service producer is unable to receive both the intra-domain address and the inter-domain address; and cancelling circuitry for cancelling the subscription associated with the event subscription notification information in response to said determining that the second service producer is unable to receive both the intra-domain address and the inter-domain address.

The received event subscription information may indicate one of the intra-domain address and the inter-domain address is to function as an endpoint for at least one event subscription notification for the service consumer, and wherein the selecting circuitry for selecting may further comprise: determining circuitry for determining that the received indicated endpoint address is incompatible with the relative domain locations of the second service producer and the service consumer; and overwriting circuitry for, in response to said determining, overwriting the indicated endpoint address to instead indicate the other of said addresses.

The first service producer may be an access and mobility function and/or a session management function.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a thirteenth aspect, there is provided non-transitory computer readable medium comprising program instructions for causing an apparatus for a network function to perform at least the following: receive, from a service consumer, event subscription information comprising an intra-domain address and an inter-domain address for signalling event subscription notification information from a service producer to the service consumer; determine whether a first service producer is located in the same domain as the service consumer; select at least one of the inter-domain address and the intra-domain address to signal to the first service producer in dependence on said determining; and signal the selected at least one address to the first service producer.

The apparatus may be caused to: determine whether the first service producer is configured to receive both the intra-domain address and the inter-domain address.

The selecting may comprise selecting both the inter-domain address and the intra-domain address for signaling to the first service producer when it is determined that the first service producer is configured to receive both the intra-domain address and the inter-domain address.

The selecting may comprise selecting one of the inter-domain address and the intra-domain address for signaling to the first service producer when it is determined that the first service producer is not configured to receive both the intra-domain address and the inter-domain address, wherein the intra-domain address is selected when it is determined that the first service producer is located in the same domain as the service consumer, and the inter-domain address is selected when it is determined that the first service producer is located in a different domain to the service consumer.

The selecting may comprise selecting one of the inter-domain address and the intra-domain address as an endpoint for at least one event subscription notification from the service producer in dependence on whether the service consumer is in the same domain or a different domain to the first service consumer; and the signalling may comprise: signalling both the inter-domain address and the intra-domain address for signaling to the first service producer; and signalling an indication of which of the inter-domain address and the intra-domain address has been selected as an endpoint.

The selecting may comprise selecting one of the inter-domain address and the intra-domain address as an endpoint for at least one event subscription notification from the service producer in dependence on whether the service consumer is in the same domain or a different domain to the first service consumer; and the signalling may comprise: signalling only the selected one of the inter-domain address and the intra-domain address to the first service producer.

The received event subscription information may indicate one of the intra-domain address and the inter-domain address is to function as an endpoint for at least one event subscription notification for the service consumer, and wherein the selecting may further comprise: determining that the received indicated endpoint address is incompatible with the relative domain locations of the first service producer and the service consumer; and in response to said determining, overwriting the indicated endpoint address to instead indicate the other of said addresses.

The network function may be one of a unified data management function and a data collection coordination function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a fourteenth aspect, there is provided non-transitory computer readable medium comprising program instructions for causing an apparatus for a service consumer to perform at least the following: signal, to a network function, event subscription information comprising an intra-domain address and an inter-domain address for signalling event subscription notification information from a service producer to the service consumer; and receive, at least one of an event subscription notification addressed from a first service producer in the same domain as the apparatus to the intra-domain address, and an event subscription notification addressed from a second service producer in a different domain than the apparatus to the inter-domain address.

The service consumer may be a network exposure function.

The event subscription information may indicate which of the intra-domain address and the inter-domain address is intended by the service consumer for use as an endpoint for receiving event subscription notification information.

The event subscription information may comprise an explicit indication as to whether the indicated endpoint address intended for use for receiving event subscription notification information is an intra-domain address or an inter-domain address.

The indicated endpoint address may be an apiRoot address in a Hypertext Transfer Protocol notification or callback Uniform Resource Identifier.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a fifteenth aspect, there is provided non-transitory computer readable medium comprising program instructions for causing an apparatus for a first service producer to perform at least the following: receive, from a network function, event subscription information comprising an intra-domain address and an inter-domain address for addressing event subscription notification information to a service consumer; select an address from the intra-domain address and the inter-domain address for addressing notification information to the service consumer, wherein the intra-domain address is selected when the first service producer is located in the same domain as the service consumer, and wherein the inter-domain address is selected when the first service producer is located in a different domain to the service consumer; and signal notification information to the service consumer using the selected address.

The apparatus may be caused to: determine that event subscription notification information for the service consumer is to be provided by a second service producer; and signal both the inter-domain address and the inter-domain address to the second service producer in response to said determining that event subscription notification information for the service consumer is to be provided by a second service producer.

The apparatus may be caused to: determine that event subscription notification information for the service consumer is to be provided by a second service producer; determining whether the second service producer is located in a same or a different domain as the service consumer; select one of the inter-domain address and the inter-domain address to the second service producer in response to said determining whether the second service producer is located in a same or a different domain as the service consumer, wherein the intra-domain address is selected when it is determined that the second service producer is located in the same domain as the service consumer, and the inter-domain address is selected when it is determined that the second service producer is located in a different domain to the service consumer; and signal the selected address to the second service producer.

The apparatus may be caused to: determine that event subscription notification information for the service consumer is to be provided by a second service producer; determining that the second service producer is able to receive both the intra-domain address and the inter-domain address; and signal both the inter-domain address and the inter-domain address to the second service producer in response to said determining that the second service producer is able to receive both the intra-domain address and the inter-domain address.

The apparatus may be caused to: determine that event subscription notification information for the service consumer is to be provided by a second service producer; determine that the second service producer is unable to receive both the intra-domain address and the inter-domain address; and signal one of the inter-domain address and the inter-domain address to the second service producer in response to said determining that the second service producer is unable to receive both the intra-domain address and the inter-domain address, wherein the intra-domain address is signalled to the second service producer when the second service producer is determined to be located in the same domain as the service consumer, and wherein the inter-domain address is selected when the second service producer is determined to be located in a different domain to the service consumer.

The apparatus may be caused to: determine that event subscription notification information for the service consumer is to be provided by a second service producer; determining that the second service producer is unable to receive both the intra-domain address and the inter-domain address; and cancel the subscription associated with the event subscription notification information in response to said determining that the second service producer is unable to receive both the intra-domain address and the inter-domain address.

The received event subscription information may indicate one of the intra-domain address and the inter-domain address is to function as an endpoint for at least one event subscription notification for the service consumer, and wherein the selecting may further comprise: determining that the received indicated endpoint address is incompatible with the relative domain locations of the second service producer and the service consumer; and in response to said determining, overwriting the indicated endpoint address to instead indicate the other of said addresses.

The first service producer may be an access and mobility function and/or a session management function.

The intra-domain address and/or the inter-domain address may be provided in a form of at least one of: an apiRoot, a Fully Qualified Domain Name, an Internet Protocol Address, and/or a Uniform Resource Indicator.

The intra-domain address may be an intra-Public Land Mobile Network address and the inter-domain address may be an inter-Public Land Mobile Network address.

According to a sixteenth aspect, there is provided a computer program product stored on a medium that may cause an apparatus to perform any method as described herein.

According to a seventeenth aspect, there is provided an electronic device that may comprise apparatus as described herein.

According to an eighteenth aspect, there is provided a chipset that may comprise an apparatus as described herein.

BRIEF DESCRIPTION OF FIGURES

Examples will now be described, by way of example only, with reference to the accompanying Figures in which:

FIGS. 1A and 1B show a schematic representation of a 5G system;

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIGS. 1A and 1B.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, etc.) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

Figure 1B:
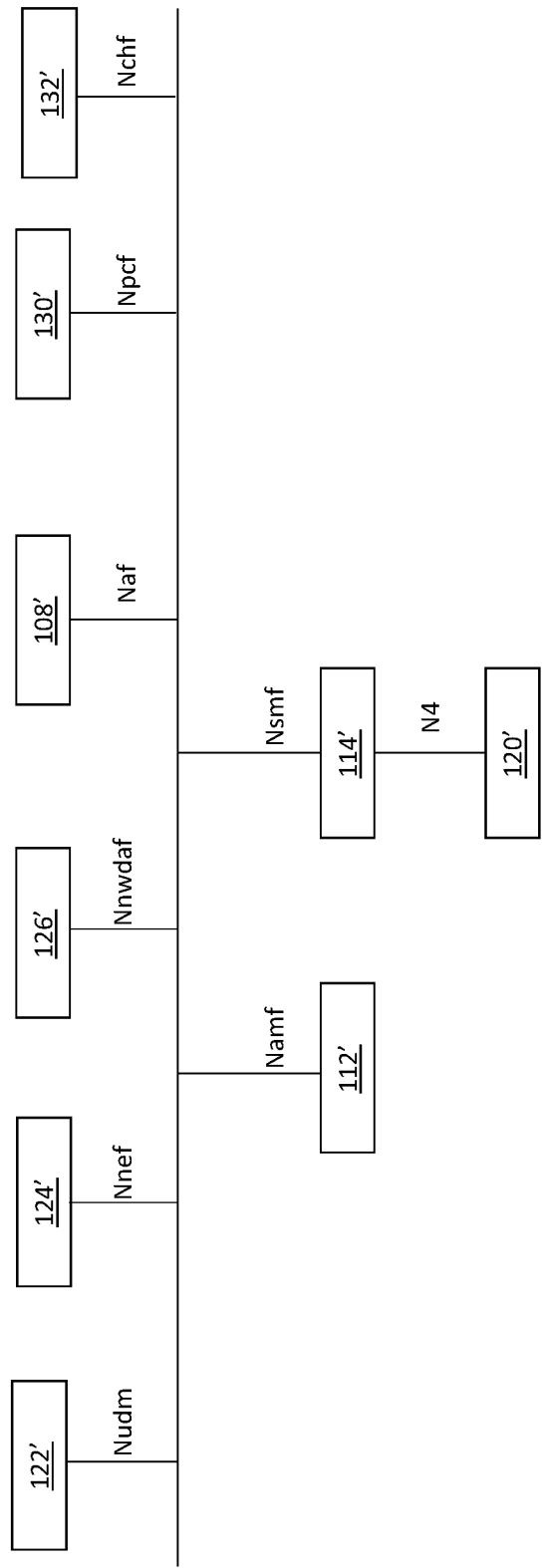

FIG. 1B shows a schematic representation of a 5GC 106' represented in current 3GPP specifications.

FIG. 1B shows a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other.

3GPP refers to a group of organizations that develop and release different standardized communication protocols. 3GPP is currently developing and publishing documents related to Release 17, relating to 5G technology, with Release 17 currently being scheduled for 2022.

Current 3GPP specifications and proposals enable a service consumer to subscribe to notifications for events from a service producer. These subscriptions may be mediated by an intermediary network node, such as a UDM or a Data Collection and Coordination Function (DCCF).

As part of this, 3GPP defines several mechanisms for routing subscription notifications through the network. The following discusses several principles in relation to routing addresses for signalling subscription notifications when an intermediate network function mediates between a network function service consumer and a network function service producer. However, it is also understood that the presently described mechanisms may also be applied to direct subscriptions from an NF service consumer to an NF service producer (i.e. subscriptions not mediated by an intermediate network function) when the UE moves between PLMNs. Such notifications often use Hypertext transfer protocol (HTTP) for formatting such signalling.

HTTP is an application layer protocol in the Internet protocol suite model. HTTP uses uniform resource identifiers (URIs) for identifying and addressing different entities when routing packets through a communication network. A URI is a unique sequence of characters that identifies a logical or physical resource used by web technologies. URIs may be used to identify anything, including real-world objects, such as people and places, concepts, or information resources such as web pages and books.

The routing of a HTTP message within the 5G system is based on a HTTP request URI (see, for example, clause 6.1 (Routing mechanisms) in 3GPP TS 29.500). URIs are currently structured in the 5G System as defined in clause 4.4 of 3GPP TS 29.501.

HTTP URIs used for inter-public landline mobile network (PLMN) signalling in the 5G System are currently required to be encoded with an apiRoot (i.e. hostname, or other endpoint for receipt of subscription notifications; see apiRoot definition in clauses 3.1 and 4.3 of 3GPP 29.501) encoding the Home Network Domain. This is currently defined in 3GPP TS 23.003, which states that "The Home Network Domain for 5GC shall be in the format specified in [Internet Engineering Task Force (IETF) [Request for comments (RFC)] 1035 and IETF RFC 1123 and shall be structured as: "5gc.mnc<MNC>.mcc<MCC>0.3gppnetwork.org". For example, a NEF in the home network domain may be identified by the following apiRoot:

nef123.5gc.mnc<MNC>.mcc<MCC>0.3gppnetwork.org/subscription456

For intra-PLMN signalling, an operator may choose its own format for the encoding of the apiRoot (i.e. endpoint for receipt of subscription notifications) of HTTP URIs, e.g. nef123.operator.com (resulting in e.g. the URI nef123.operator.com/subscription456 for identifying the subscription 456 in the NEF).

When an NF service consumer (NFc), such as an NEF, subscribes to events from an NF service producer (NFp) via an intermediate NF (e.g. via a UDM), the NFc does not know whether the user is roaming in a visited PLMN (VPLMN) or is instead located within its home PLMN (HPLMN).

Although it has been proposed to configure an NEF (i.e. an NFc) to always provide an inter-PLMN URI to a UDM (i.e. to an intermediate NF) so that NFp notifications, e.g., VPLMN AMF and HPLMN AMF notifications, can be routed to NEF directly, this may be problematic in some scenarios. For example, even if an NFp within the same PLMN as the NEF may resolve an inter PLMN Fully Qualified Domain Name (FQDN) into an NEF URI address, operators may have a policy for the NEF to use different Internet Protocol (IP) endpoints for inter-PLMN and intra-PLMN traffic. Therefore, even if the AMF successfully resolves an inter-PLMN FQDN into some IP address, it may not be desired to use that same IP address for messages coming from the same PLMN (i.e. for intra-PLMN traffic).

When an NF service consumer (e.g. NEF) subscribes to NFs (AMF/SMF) related to a UE-specific event via an intermediate NF (e.g. via a UDM), then the AMF/SMF can directly send the notification to NF service consumer on the notification URI provided by NF service consumer. The UE may be in a HPLMN or a VPLMN or may move to VPLMN in the near time. There is currently no way for an NEF to accurately determine the roaming status of the UE and send an inter-PLMN FQDN or a normal/intra-PLMN as a part of a Notification URI in the subscription request.

Further, in some events (for example, UE Reachability event to report when or whether a UE is reachabble) a VPLMN AMF and a UDM may both send the subscription notification to NEF. Therefore, knowing the UE roaming status is not always useful. Last but not least, a UE may also move across PLMNs, in which case event subscriptions created in the source AMF are moved to the target AMF; when the UE would move between a VPLMN and HPLMN, the apiRoot of the notification URI sent to the source AMF may not be appropriate to use at the target AMF.

When the NFc sends an intra-PLMN FQDN URI as a notification URI, then when UE moves/registers in VPLMN, the VPLMN NFp cannot send the notification to HPLMN NFc/NEF.

Further, If the NFc always sends an inter-PLMN URI, then the subscription notification will always be received at the same IP endpoints, which may be contrary to operator policies that the NFc uses different IP endpoints for inter-PLMN and intra-PLMN. Having the same URI for both inter-PLMN and intra-PLMN would mean that this operator deployment scenario can be not be supported.

As of now, there are no solutions available to provide both URI and select the URI correctly at the intermediate NF or at the NFp.

Similar issues also exist when an NFc starts collecting data from a VPLMN NFp (e.g. an AMF or SMF) via a Data Collection Coordination Function (DCCF), which allows NFcs to receive data from a plurality of sources via the DCCF. It would therefore be useful for any solution to be applicable to both this use case, as well as future use cases for an intermediate NF facilitating subscriptions to an NFp on behalf of an NFc.

Per existing 3GPP specification, when an NFc subscribes to an event, it creates a subscription in which it provides the notification URI (also called callback URI) where it asks to receive corresponding event notifications.

The following discloses that when creating a subscription to some events (which may include the existing notification URI subscription request), the NFc provides additional information in the subscription request. This additional information may be used by other network entities for facilitating routing through a communication network.

This additional information may optionally indicate whether the notification URI being provided is for use for intra and/or inter-PLMN signalling.

This additional information may comprise parameters associated with at least one of an intra-PLMN FQDN and/or an inter-PLMN FQDN, and/or an extra URI for inter-PLMN notification request, and/or an extra URI for intra-PLMN notification request.

In the absence of the additional indication about the provided URI, the intended use of the provided URI may be implicitly indicated through a prior agreement. For example, it may be pre-agreed that, by default, the URI received from NFc in the subscription request is for addressing the inter-PLMN FQDN. Alternatively, it may be pre-agreed that, by default, the URI received from NFc in the subscription request is for addressing the intra-PLMN FQDN. This latter default agreement will not often be suitable when an intermediate NF selects an NFp in different PLMN, depending on the operator options applied.

The additional information may be comprised in a HTTP header. Alternatively or in addition, the additional information may be comprised in the subscription data (e.g. JavaScript Open Notation (JSON) payload).

The following illustrates how a service-based interface (SBI) header currently defined in 3GPP specifications may be enhanced to comprise additional information as described above. Similar enhancements may also be defined in a new HTTP header or in any other already defined service-based interface (SBI) header.

For the purpose of brevity and clarity, the following will illustrate this additional information with reference to the 3gpp-Sbi-Consumer-Info header defined in 3GPP TS 29.500. In this example, the header may be enhanced to comprise the optional indication whether the notification URI being provided is for use for intra and/or inter-PLMN signalling, and/or an intra-PLMN FQDN and/or an inter-PLMN FQDN, and/or an extra URI for inter-PLMN notification request, and/or an extra URI for intra-PLMN notification request.

Clause 5.2.3.3.7 (3gpp-Sbi-Consumer-Info) of 3GPP TS 29.500 states that this 3gpp-Sbi-Consumer-Info header comprises a comma-delimited list of NF service consumer information from an HTTP client (as NF service consumer). The encoding of the header may follow the Augmented Backus-Naur Form as defined in IETF RFC 7230. The header may be expressed as:

3gpp-Sbi-Consumer-Info="3gpp-Sbi-Consumer-Info"
    ";"1#(OWS supportedService";"OWS support-
    edVersions[";"OWS supportedFeatures][";"OWS
    acceptEncoding][";"OWS UriIntraPlmnInd][";
    "OWS intraPlmnNfcAddr][";"OWS inter-
    PlmnNfcAddr])

Where supportedService="service=" servicename
    servicename=1*("-"/%x61-7A), and the parameters in bold indicates the potential additional information that may be comprised in this header.

The supported Service parameter indicates the name of a service, as defined in 3GPP TS 29.510, which is supported by the sender as NF service consumer.

supportedVersions="apiversion=" "(OWS[majorver-
    sion*(RWS majorversion)OWS]")"

majorversion=%x31–39[*DIGIT]

The supported Versions parameter indicates the major version(s) of the service API that are supported by the sender as NF service consumer.

supportedFeatures="supportfeatures="features features=*HEXDIG

The Supported Features parameter carries a string containing a bitmask in hexadecimal representation, as specified for SupportedFeatures data type in 3GPP TS 29.571, to indicate the feature(s) of the service API that are supported by the sender as NF service consumer.

acceptEncoding="acceptencoding="%x22 accepten-
    coding%x22 acceptencoding=#(codings[weight])

token "codings" and "weight" are defined in IETF RFC 7231 clause 5.3.4

The Accept Encoding carries a string indicating the accepted content encodings supported by the sender as NF service consumer, when receiving notifications defined by the service.

UriIntraPlmnInd=("uriIntraPlmnInd:"boolean)

intraPlmnNfcAddr=intraPlmnNfcUri/in-
    traPlmnNfcFqdn interPlmnNfcAddr=interPlmnNfcUri/inter-
    PlmnNfcFqdn Intra plmn NFc URI or intra plmn NFc fqdn supported by the sender as NF service consumer.

intraPlmnNfcUri=("intraPlmnNfcUri:"OWS URI)

intraPlmnNfcFqdn=("intraPlmnNfcFqdn:"OWS fqdn)

interPlmnNfcUri=("interPlmnNfcUri:"OWS URI)

interPlmnNfcFqdn=("interPlmnNfcFqdn:"OWS fqdn)

Boolean=true/false where fqdn encodes an FQDN.

The following presents another example of how the 3gpp-Sbi-Consumer-Info header may be expressed:

3gpp-Sbi-Consumer-Info="3gpp-Sbi-Consumer-Info"
    ":"1#(OWS supportedService";"OWS support-
    edVersions[";"OWS supportedFeatures][";"OWS
    acceptEncoding][";"OWS uriPlmnInd][";"OWS
    intraPlmnApiRoot][";"OWS interPlmnApiRoot])

supportedService="service="servicename servicename=1*("-"/%x61-7A)

The Supported Service parameter indicates the name of a service, as defined in 3GPP TS 29.510, which is supported by the sender as NF service consumer.

supportedVersions="apiversion="OWS[majorversion*(RWS majorversion)OWS]")"

majorversion=%x31-39[*DIGIT]

The Supported Versions parameter indicates the major version(s) of the service API that are supported by the sender as NF service consumer.

supported Features="supportfeatures="features features=*HEXDIG

The Supported Features parameter carries a string comprising a bitmask in hexadecimal representation, as specified for SupportedFeatures data type in 3GPP TS 29.571, to indicate the feature(s) of the service API that are supported by the sender as NF service consumer.

acceptEncoding="acceptencoding="%x22 acceptencoding%x22 acceptencoding=#(codings[weight])

where token "codings" and "weight" are defined in IETF RFC 7231 clause 5.3.4

The Accept Encoding parameters comprises a string indicating the accepted content encodings supported by the sender as NF service consumer, when receiving notifications defined by the service.

uriPlmnInd="uriPlmnInd="OWS uriPlmnIndValue uriPlmnIndValue=INTERPLMN/INTRAPLMN

Under the currently defined scheme, this header may further comprise an indication of whether an intra-PLMN or inter-PLMN callback URI is sent by NF service consumer in the subscription request.

intraPlmnApiRoot="intraPlmnApiRoot="OWS scheme "://"authority[prefix]

interPlmnApiRoot="interPlmnApiRoot="OWS scheme "://"authority[prefix]

scheme="http"/"https"

authority=host[":"port]

port=*DIGIT prefix=path-absolute path-absolute production rule from IETF RFC3986,clause 3.3

The intra-PLMN APIroot/endpoint and/or inter-PLMN APIroot/endpoint supported by the sender as NF service consumer may thus be indicated.

The 3GPP-Sbi-Comsumer-Info header may comprise combinations of the above-described parameters. To illustrate this, the following provides examples of what may be comprised in a 3GPP-Sbi-Comsumer-Info header.

EXAMPLE 1: The NF Consumer Supports Namf_EventExposure OpenAPI "v1": This may expressed as:

3gpp-Sbi-Consumer-Info:service=namf-evts;apiversion=(1)

EXAMPLE 2:the NF Consumer Supports Nsmf_EventExposure OpenAPI "v1" and "v2" with Supported Features parameter and accepted encoding "gzip". This may be expressed as:

3gpp-Sbi-Consumer-Info: service=nsmf-event-exposure;apiversion=(12);supportedfeatures=01; acceptencoding="gzip;q=1.0,*;q=0.5"

EXAMPLE 3:The NF consumer supports both Namf_EventExposure OpenAPI "v1" and Nsmf_EventExposure OpenAPI "v2". This may be expressed as:

3Gpp-Sbi-Consumer-Info:Service=Namf-Evts;Apiversion=(1),Service=Nsmf-Event-Exposure;Apiversion=(2)

EXAMPLE 4: The NF consumer supports Namf_EventExposure OpenAPI "v1" and sends an inter-PLMN callback URI in the subscription request and an intra-PLMN API root in the header https://operator.com. This may be expressed as:

3gpp-Sbi-Consumer-Info: service=namf-evts;apiversion=(1),uriPlmnInd:INTERPLMN; intraPlmnApiRoot=https%3A%2F%2Foperator.com As an example, consider the NF consumer supporting Namf_EventExposure OpenAPI "v1" and intra plmn NFc "operator.com". In this case, the 3gpp-Sbi-Consumer-Info header may be expressed as:

3Gpp-Sbi-Consumer-Info:Service=Namf-Evts;Apiversion=(1),intraPlmnNfcFqdn: Operator.Com; UriIntraPlmnInd:False.

Alternatively or in addition, the interPlmnNfcFqdn and/or interPlmnNfcUri parameters may also be comprised in the header or Information Element.

As described in more detail herein, the address information may also be transferred between AMFs when a mobility event occurs and the source AMF determines to transfer the address information to the target AMF. This may be effected by modifying a currently defined N-amf open communication API to additionally comprise the information in bold below:

nfConsumerInfo:
  type: array
  items:
    type: string
    minitems: 1 where the array entries encode the value of the 3gpp-Sbi-Consumer-Info header.

During inter-AMF mobility, the source AMF may thus transfer the above information to the target AMF. The following table illustrates some of the information that may be comprised in consumer info provided passed from the source AMF to the target AMF during such an operation:

| Attribute name | Data type | Cardinality | Description |
|---|---|---|---|
| bindingInfo | array(string) | 1 . . . 2 | Binding indications received for event notifications (i.e. with "callback" scope) or for subscription change event notifications (i.e. with "subscription-events" scope) for an AMF event subscription. |

-continued

| Attribute name | Data type | Cardinality | Description |
| --- | --- | --- | --- |
| | | | When present, entries of the array may be set to the value of the 3gpp-Sbi-Binding header defined in clause 5.2.3.2.6 of 3GPP TS 29.500, without the header name. Example of an array entry: "bl= nf-set; nfset=set1.udmset.5gc.mnc012.mcc345; servname=nudm-ee;scope=subscription-events" |
| subscribingNfType | NFType | 0 . . . 1 | This Information Element may be present if the information is available. When present, it comprises the NF type of the NF that created the subscription. |
| nfConsumerInfo | array(string) | 1 . . . N | When present, this Information Element may comprise the NF Service Consumer information received from the intermediate NF in case of indirect subscription (e.g. NEF) and entries of the array may be set to the value of the 3gpp-Sbi-Consumer-Info header defined in clause 5.2.3.3.7 of 3GPP TS 29.500, without the header name. |

A backwards compatibility check may also be performed. When the intermediate NF does not support the enhancement, the NFc may include only the inter-PLMN URI in the Notification URI.

Once the intermediate NF has received the notification address information from the NFc, the intermediate NF may determine what address information to provide to NFp.

When propagating the subscription request to an NFp, the intermediate NF (e.g. the UDM) determines which URI received from NFc is suitable for the NFp, based on whether NFp is in the same PLMN or not. This may be performed in at least two different ways, depending on whether the Nfp is configured to recognize the additional information.

When the NFp is configured to recognize the additional information, this ability may be will registered in the NFp's profile in the NRF. This is labelled herein as a new indication "EnhNotifRouting", and may indicate that the NFp supports enhanced notification routing. Alternatively, the NFp application programming interface (API) defines a new feature bit for EnhNotifRouting. Accordingly, the intermediate NF (e.g. UDM) may check whether the target NFp supports the enhancement, and, when the NFp does support the enhanced header, the intermediate NF may provide everything received from NFc to NFp assuming NFp can formulate the URI correctly.

When the NFp is not configured/registered as being able to support the enhanced header/additional information, the intermediate NF (e.g. UDM) may check whether the URI that it received from NFc is otherwise suitable to be understood and used by the NFp.

When it is (e.g. NFc includes an inter-PLMN URI in the notification URI and the user is roaming), the intermediate NF sends the received notification URI to NFp.

When is not, e.g. the NFc comprised an inter-PLMN URI in the notification URI and the user is not roaming), the intermediate NF may overwrite the apiRoot/endpoint address for subscriptions of the existing notification/callback URI with the Intra-Plmn URI when intraPlmnNfcFqdn is received (or the intermediate NF overwrites the entire notification URI with the intraPlmnNfcUri, depending on the information available and what the NFp may understand).

For clarity, it is understood that the term intraPlmnNfcUri represents a URI address for an NFc for intra-PLMN routing. It is further understood that the term intraPlmnNfcFqdn represents a FQDN for an NFc for intra-PLMN routing. It is further understood that the term interPlmnNfcUri represents a URI address for an NFc for inter-PLMN routing. It is further understood that the term interPlmnNfcFqdn represents a FQDN for an NFc for inter-PLMN routing. The intraPlmnApiRoot may comprise an FQDN or an IP address, while an interPlmnApiRoot comprises a FQDN for routing a notification to a target PLMN (according to 3GPP requirements for inter-PLMN routing).

Alternatively, when the NFc comprised an intra-PLMN URI in the notification URI and the user is roaming, the intermediate NF may overwrite the apiRoot of the existing notification/callback URI with the interPlmnNfcFqdn (or the intermediate NF overwrites the entire notification URI with the interPlmnNfcUri, depending on the information available and what the NFp may understand).

Having determined what information and the form of information to send to the NFp, the intermediate NF sends the resulting notification URI to NFp.

At least one of the intermediate NF and the NFp may use the selected address for routing subscription-related information to an NFc, such as a subscription notification.

For example, when the intermediate NF (in the HPLMN) needs to generate a notification towards the NFc (in HPLMN), the intermediate NF may use the intra PLMN URI while sending the notification.

As another example, when the NFp is configured to support receiving the additional information, the NFp may determine the PLMN to use to send notifications to the NFc or intermediate NF based on request received. The NFp may accordingly prepare inter PLMN URI or intra PLMN URI from the received information and send the notification accordingly.

When the NFp is not configured to support receiving the additional information, the NFp may simply send the notification using the received notification URI.

The provided address information may also be used for mobility-related events.

For example, it is possible that the UE that is being provided the service moves from a first VPLMN to a second PLMN, included changing NFps (e.g. changing AMFs). In other words, the UE may migrate from a first NFp (VPLMN1 AMF1) to a second NFp (VPLMN2 AMF2). When mobility is supported between two such PLMNs, then AMF2 may receive the subscription created by intermediate NFs (or even subscriptions created directly by an NF service consumer).

For example, when AMF1 (source NFp) determines that AMF2 (target NFp) supports the enhancement, then AMF1 may pass all of the URIs received to AMF2. Then AMF2 may formulate the URI while sending the notifications When AMF1 (source NFp) determines that AMF2 (target NFp) does not support the enhancement, then AMF1 may either terminate the current subscription, or provide an appropriate notification URI to AMF2. For example, if AMF1 determines NFc PLMN from the interPlmnNfcfqdn (which contains NFc PLMN ID) and AMF2 PLMN ID, AMF1 may provide the inter PLMN URI or the intra PLMN URI to AMF2 based on whether AMF2 and NFc pertain to the same PLMN or not.

The following discusses some more specific examples of how the presently described techniques may be implemented in current networks. However, it is understood that this is merely for example only, and that other configurations may be employed depending on the exact configuration of the network.

In the above, when an NF service consumer subscribes to an intermediate NF for events, which may be detected and reported directly by target NF (e.g. an NEF subscribes to Location Reporting event at AMF via UDM and AMF directly reports to the NEF), the NF service consumer may comprise the "3gpp-Sbi-Consumer-Info" header in the subscription creation request to indicate the supported API versions, features and accepted encodings of the service on the target NF.

When subscribing to the target NF and requiring the target NF to directly report to NF service consumer, the intermediate NF may invoke the highest API version at the target NF which is supported by the NF service consumer (if indicated) and the intermediate NF. The intermediate NF may include all received "3gpp-Sbi-Consumer-Info" header(s) in the subscription creation request sent to the target NF.

When the target NF received this header in event subscription creation, the target NF may generate the request body according to the supported feature(s) and accepted encodings of the NF service consumer for notifications directly sent to the NF service consumer.

When a subscription is related to UE that may roam in VPLMN, the NF service consumer provides an inter-PLMN FQDN-based notification URI to the intermediate NF (see clause 6.1.4.3 of 3GPP TS 38.500) to enable the VPLMN NF service producer to route the notification directly to the NF service consumer in the HPLMN.

The NF Service Consumer may also include the following information in the "3gpp-Sbi-Consumer-Info" header:
  the uriPlmnInd parameter indicating whether the subscription request includes an intra-PLMN or inter-PLMN callback URI; and
  the intraPlmnApiRoot parameter comprising the callback API Root for receiving intra-PLMN notifications and/or the interAplmnApiRoot containing the callback API Root for receiving inter-PLMN notifications.

Upon receiving a subscription request including the above information in the "3gpp-Sbi-Consumer-Info" header, the intermediate NF should check if the NF Service Provider is in VPLMN or HPLMN and adapt the apiRoot of the callback URI according to the information received from the NF service consumer. For instance, if the NF service consumer included an inter-PLMN callback URI in the subscription request:
  when the NF Service Provider is in HPLMN, then the intermediate NF should replace the apiRoot of the callback URI in the subscription request with the provided intraPlmnApiRoot and change the uriPlmnInd of the "3gpp-Sbi-Consumer-Info" header to INTRAPLMN while sending the subscription creation request to the target NF; and
  when the NF Service Provider is in VPLMN, then the intermediate NF shall not change the notification/callback URI.

In either case, the Intermediate NF should then forward the "3gpp-Sbi-Consumer-Info" header in the subscription creation request sent to the target NF. The NF Service Provider shall send the notification based on the received notification/callback URI in the subscription request.

During inter-AMF mobility, the source NF should forward the received "3gpp-Sbi-Consumer-Info" header to the target NF. During an inter-PLMN AMF mobility, the target AMF that receives the "3gpp-Sbi-Consumer-Info" header from the source AMF should determine the PLMN of the NF Service Consumer where notification needs to be sent and form accordingly the notification URI with the intraPlmnApiRoot or interPlmnApiRoot.

FIGS. 6 to 9 illustrate aspects of the above through example signalling diagrams in which an NFp is being subscribed to to send notification via an intermediate NF, such as a UDM.

Figure 6:
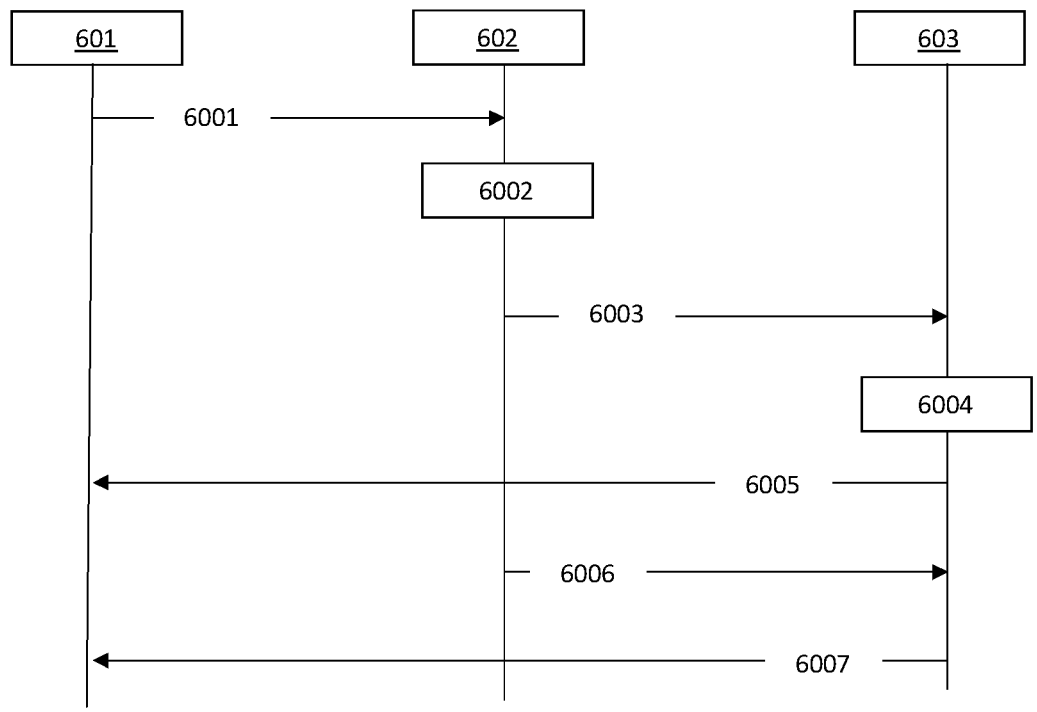
FIGS. 6 to 9 illustrate example signalling diagrams.

FIG. 6 illustrates signalling that may be performed between an NFc (e.g. an NEF) 601, an intermediate NF (e.g. a UDM) 602, and an NFp 603.

At 6001, the NFc 601 signals the intermediate NF 602. This signalling may comprise a subscribe request that comprises a notification address/URI to where subscription notifications are to be delivered. This notification address may be labelled as an NFc URI.

This signalling may further comprise an indication of whether the provided notification address is an Intra-PLMN identifier (e.g. by indicating "true" or "false" in a predetermined element). Where the provided notification address is indicated as being an intra-PLMN address, the signalling may further comprise an identifier of an inter-PLMN address for a roaming case. This inter-PLMN address may be provided in the form of a URI and/or in the form of a FQDN and/or in the form of an apiRoot.

At 6002, the intermediate NF 602 determines whether the NFp 603 is located in a VPLMN or in a HPLMN. The intermediate NF 602 may further determine whether the NFp is configured to be able to receive, understand, and use both intra-PLMN and inter-PLMN addresses contemporaneously. In other words, the intermediate NF 602 determines whether the NFp 603 is configured to support the enhanced address information described herein.

When the NFp 603 is configured to support the enhanced address information, the mechanism proceeds to 6003.

At 6003, the intermediate NF 602 signals a subscribe request to the NFp 603. This signalling may comprise the information provided in the signalling of 6001. In other words, this signalling may comprise a subscribe request that comprises a notification address/URI to where subscription notifications are to be delivered. This notification address may be labelled as an NFc URI.

This signalling may further comprise an indication of whether the provided notification address is an Intra-PLMN identifier (e.g. by indicating "true" or "false" in a predetermined element). Where the provided notification address is indicated as being an intra-PLMN address, the signalling may further comprise an identifier of an inter-PLMN address for a roaming case. This inter-PLMN address may be provided in the form of a URI and/or in the form of a FQDN.

At 6004, the NFp 603 determines which notification address to use, depending on the PLMN in which the NFc 601 is located and the PLMN in which the NFp 603 is located. For example, when NFc 601 and NFp 603 are located in different PLMNs, the inter-PLMN notification address is selected for sending subscription notifications to. Further, when NFc 601 and NFp 603 are located in the same PLMN, the intra-PLMN notification is selected for sending subscription notifications to.

At 6005, the NFp 603 signals a notification to the NFc 601 in accordance with the subscription established through the signalling of 6001 to 6004. This signalled notification is provided to the notification address selected at 6004.

When the NFp 603 is not configured to support the enhanced address information, the mechanism proceeds to 6006 from 6002.

At 6006, the intermediate NF 602 signals a subscribe request to the NFp 603. This signalling may comprise a single notification address for providing the subscription notifications in. This notification address comprised in the signaling of 6006 may be selected by the intermediate NF 602. The selection may be performed in dependence on the relative locations of the NFc 601 and the NFp 603. For example, when NFc 601 and NFp 603 are located in different PLMNs, the inter-PLMN notification address is selected for sending subscription notifications to. Further, when NFc 601 and NFp 603 are located in the same PLMN, the intra-PLMN notification is selected for sending subscription notifications to.

At 6007, the NFp 603 signals a notification to the NFc 601 in accordance with the subscription established through the signalling of 6001 to 6002 and 6006. This signalled notification is provided to the notification address provided at 6006.

Figure 7:
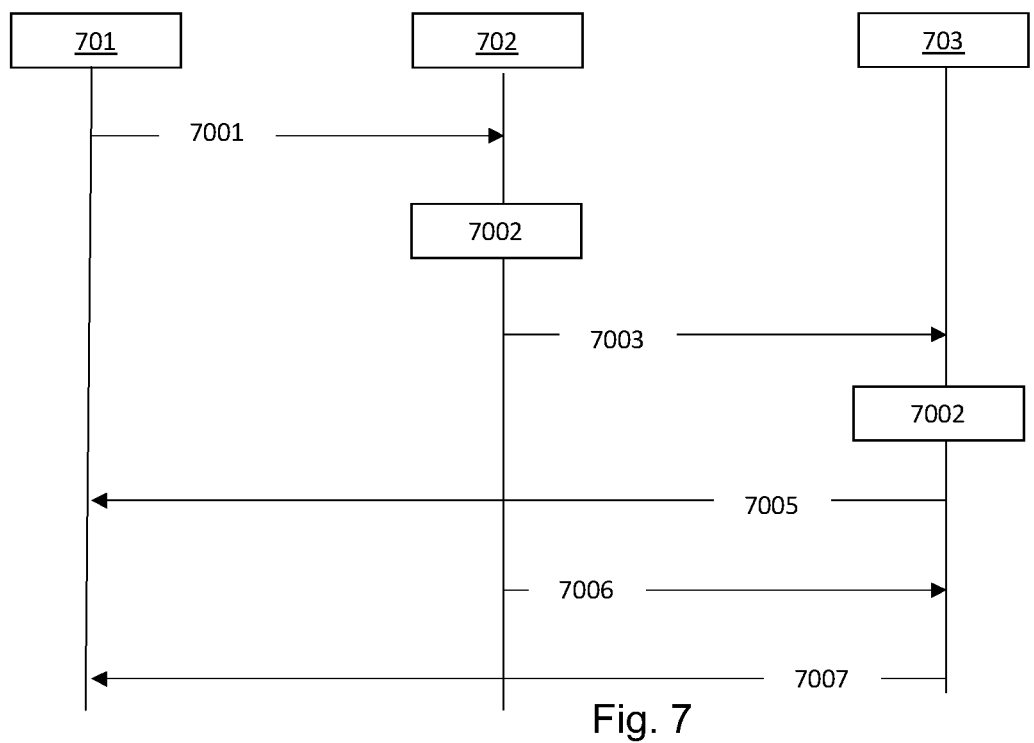

FIG. 7 provides a more specific example of FIG. 6 in which an NFc provides a notification URI for both inter-PLMN signalling and an intra-PLMN FQDM when the user is not roaming.

FIG. 7 illustrates signalling that may be performed between an NFc (e.g. an NEF) 701, an intermediate NF (e.g. a UDM) 702, and an NFp 703.

At 7001, the NFc 701 signals the intermediate NF 702. This signalling may comprise a subscribe request that comprises a notification address/URI to where subscription notifications are to be delivered. This notification address may be labelled as an NFc URI. This notification URI may be labelled as "nef123.5gb.mnc345.mcc012.3ppnetwork, org/subscription456" in the present example.

This signalling may further comprise an indication of whether the provided notification address is an Intra-PLMN identifier (e.g. by indicating "true" or "false" in a predetermined element). For example, as the indicator may indicate that "URIIntraPLMNInd: False". This false indication indicates that the notification URI provided is not an intra-PLMN identifier.

The signalling may further comprise a FQDN for the Intra-PLMN NFc address. This may be labelled as "IntraPlmnNfcFqdn— nef123.operator.com".

At 7002, the intermediate NF 702 determines whether the NFp 703 is located in a HPLMN. The intermediate NF 702 may further determine whether the NFp is configured to be able to receive, understand, and use both intra-PLMN and inter-PLMN addresses contemporaneously. In other words, the intermediate NF 702 determines whether the NFp 703 is configured to support the enhanced address information described herein.

When the NFp 703 is configured to support the enhanced address information, the mechanism proceeds to 7003.

At 7003, the intermediate NF 702 signals a subscribe request to the NFp 703. This signalling may comprise the information provided in the signalling of 7001. In other words, this signalling may comprise a subscribe request that comprises a notification address/URI to where subscription notifications are to be delivered. This notification address may be labelled as an NFc URI. This notification URI may be labelled as "nef123.5gb.mnc345.mcc012.3ppnetwork, org/subscription456" in the present example.

This signalling may further comprise an indication of whether the provided notification address is an Intra-PLMN identifier (e.g. by indicating "true" or "false" in a predetermined element). For example, as the indicator may indicate that "URIIntraPLMNInd: False".

The signalling may further comprise a FQDN for the Intra-PLMN NFc address. This may be labelled as "IntraPlmnNfcFqdn=nef123.operator.com".

At 7004, the NFp 703 determines which notification address to use. In the present example, as both NFc 701 and NFp 703 are located in the same PLMN, the intra-PLMN notification is selected for sending subscription notifications to, i.e. to "nef123.operator.com/subscriptn456" in the present example.

At 7005, the NFp 703 signals a notification to the NFc 701 in accordance with the subscription established through the signalling of 7001 to 7004. This signalled notification is provided to the notification address selected at 7004, i.e. to "nef123.operator.com/subscriptn456" in the present example.

When the NFp 703 is not configured to support the enhanced address information, the mechanism proceeds to 7006 from 7002.

At 7006, the intermediate NF 702 signals a subscribe request to the NFp 703. This signalling may comprise a single notification address for providing the subscription notifications in. This notification address comprised in the signaling of 7006 may be selected by the intermediate NF 702. The selection may be performed in dependence on the relative locations of the NFc 701 and the NFp 703. As NFc 701 and NFp 703 are located in the same PLMN in the present example, the intra-PLMN notification is selected for sending subscription notifications to, i.e. "nef123.operator.com/subscriptn456" is selected the present example.

At 7007, the NFp 703 signals a notification to the NFc 701 in accordance with the subscription established through the signalling of 7001 to 7002 and 7006. This signalled notification is provided to the notification address provided at 7006, i.e. to "nef123.operator.com/subscriptn456" in the present example.

Figure 8:
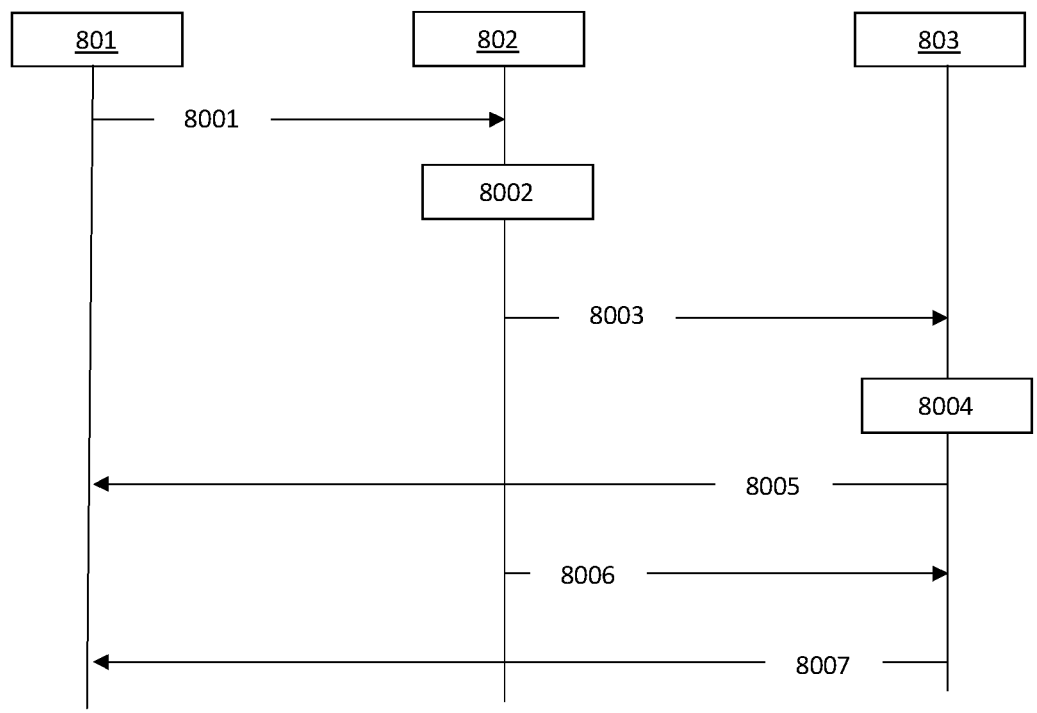

FIG. 8 illustrates a more specific example of FIG. 6 in which the NFc provides a notification URI/address for inter-PLMN signalling as well as an intra-PLMN FQDN when the user is roaming in a VPLMN.

FIG. 8 illustrates signalling that may be performed between an NFc (e.g. an NEF) 801, an intermediate NF (e.g. a UDM) 802, and an NFp 803.

At 8001, the NFc 801 signals the intermediate NF 802. This signalling may comprise a subscribe request that comprises a notification address/URI to where subscription notifications are to be delivered. This notification address may be labelled as an NFc URI. This notification URI may be labelled as "nef123.5gb.mnc345.mcc012.3ppnetwork, org/subscription456", and represent an inter-PLMN notification address for the requested subscription.

This signalling may further comprise an indication of whether the provided notification address is an Intra-PLMN identifier (e.g. by indicating "true" or "false" in a predetermined element). For example, as the indicator may indicate that "URIIntraPLMNInd: False". This false indication indicates that the notification URI provided is not an intra-PLMN identifier.

The signalling may further comprise a FQDN for the Intra-PLMN NFc address. This may be labelled as "IntraPlmnNfcFqdn=nef123.operator.com".

At 8002, the intermediate NF 802 determines whether the NFp 803 is located in a HPLMN. The intermediate NF 802 may further determine whether the NFp is configured to be able to receive, understand, and use both intra-PLMN and inter-PLMN addresses contemporaneously. In other words, the intermediate NF 802 determines whether the NFp 803 is configured to support the enhanced address information described herein.

When the NFp 803 is configured to support the enhanced address information, the mechanism proceeds to 8003.

At 8003, the intermediate NF 802 signals a subscribe request to the NFp 803. This signalling may comprise the information provided in the signalling of 8001. In other words, this signalling may comprise a subscribe request that comprises a notification address/URI to where subscription notifications are to be delivered. This notification address may be labelled as an NFc URI. This notification URI may be labelled as "nef123.5gb.mnc345.mcc012.3ppnetwork, org/subscription456" in the present example.

This signalling may further comprise an indication of whether the provided notification address is an Intra-PLMN identifier (e.g. by indicating "true" or "false" in a predetermined element). For example, as the indicator may indicate that "URIIntraPLMNInd: False".

The signalling may further comprise a FQDN for the Intra-PLMN NFc address. This may be labelled as "IntraPlmnNfcFqdn— nef123.operator.com".

At 8004, the NFp 803 determines which notification address to use. In the present example, as both NFc 801 and NFp 803 are located in different PLMNs, the inter-PLMN notification is selected for sending subscription notifications to, i.e. to "nef123.5gb.mnc345.mcc012.3ppnetwork, org/subscription456" in the present example.

At 8005, the NFp 803 signals a notification to the NFc 801 in accordance with the subscription established through the signalling of 8001 to 8004. This signalled notification is provided to the notification address selected at 8004, i.e. to "nef123.5gb.mnc345.mcc012.3ppnetwork, org/subscription456" in the present example.

When the NFp 803 is not configured to support the enhanced address information, the mechanism proceeds to 8006 from 8002.

At 8006, the intermediate NF 802 signals a subscribe request to the NFp 803. This signalling may comprise a single notification address for providing the subscription notifications in. This notification address comprised in the signaling of 8006 may be selected by the intermediate NF 802. The selection may be performed in dependence on the relative locations of the NFc 801 and the NFp 803. As NFc 801 and NFp 803 are located in different PLMNs in the present example, the inter-PLMN notification is selected for sending subscription notifications to, i.e. "nef123.5gb.mnc345.mcc012.3ppnetwork, org/subscription456" is selected the present example.

At 8007, the NFp 803 signals a notification to the NFc 801 in accordance with the subscription established through the signalling of 8001 to 8002 and 8006. This signalled notification is provided to the notification address provided at 8006, i.e. to "nef123.5gb.mnc345.mcc012.3ppnetwork, org/subscription456" in the present example.

It is understood that although the above examples of FIGS. 7 to 8 illustrate examples in which the notification URI/address is indicated as being an inter-PLMN address, that analogous signalling diagrams may be constructed when the notification address is indicted as being an intra-PLMN address. In this case, the provided additional address information is an inter-PLMN address.

Similarly, although in the above examples, the new intra-PLMN FQDN or inter-PLMN FQDN parameters are provided as addresses for the intra-PLMN and inter-PLMN respectively, that these addresses may instead be provided by an appropriate URI instead. In this case, not only the apiRoot, but also possibly the path after the APIRoot may be different for the intra-PLMN address compared to the inter-PLMN address.

Figure 9:
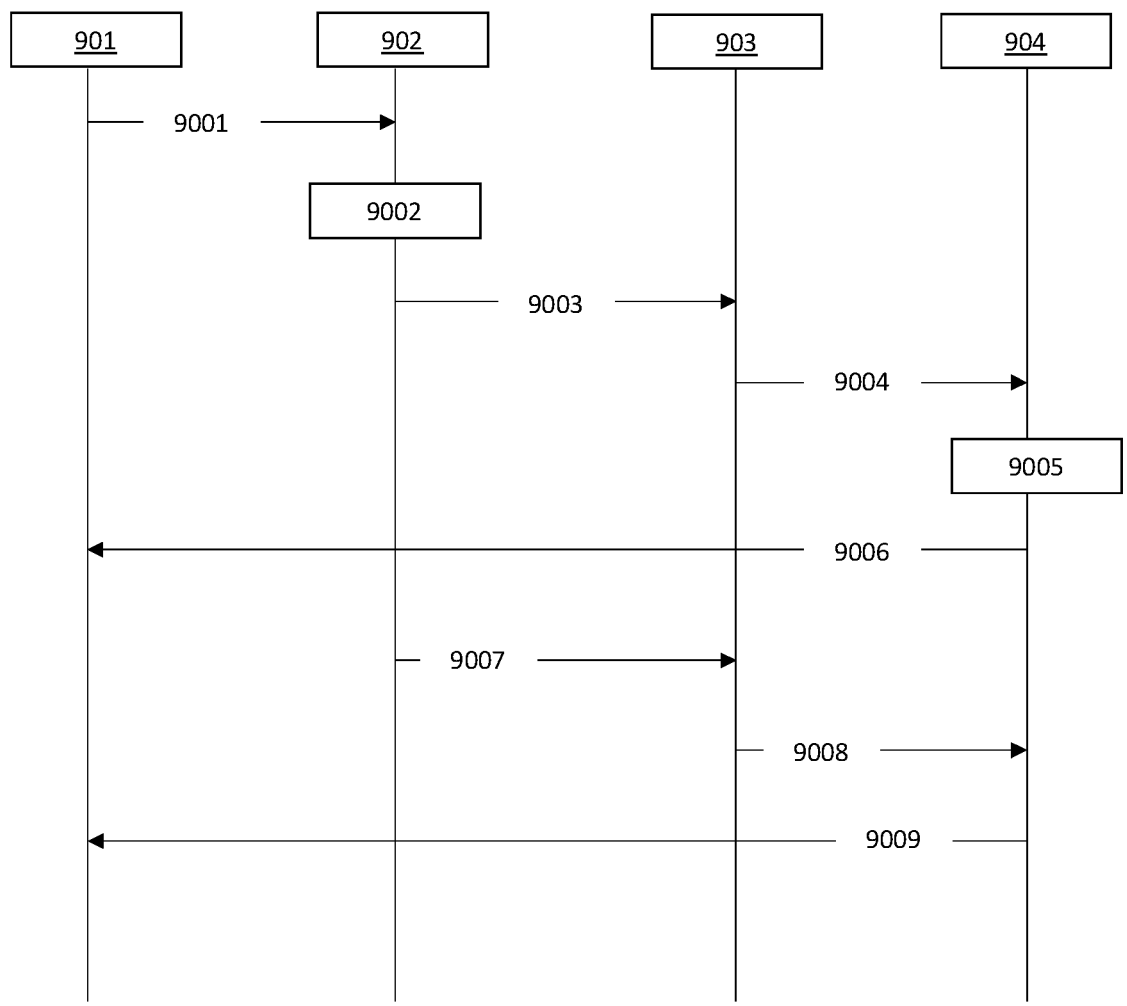

FIG. 9 is a call signalling diagram showing an example in which a first NFp transfers the address information received for subscription notifications to a second NFp. This may happen during a mobility event such as, for example, when there is a change in AMF.

FIG. 9 illustrates signalling that may be performed between an NFc (e.g. an NEF) 901, an intermediate NF (e.g. a UDM) 902, a first NFp 903, and a second NFp 904.

At 9001, the NFc9801 signals the intermediate NF 802. This signalling may comprise a subscribe request that comprises a notification address/URI to where subscription notifications are to be delivered. This notification address may be labelled as an NFc URI.

This signalling may further comprise an indication of whether the provided notification address is an Intra-PLMN identifier (e.g. by indicating "true" or "false" in a predetermined element).

Assuming that the notification URI provided in the signalling of 9001 is for an intra-PLMN notification address, the signalling may further comprise an address for the Inter-PLMN NFc address. This address for the inter-PLMN address may be provided as a URI and/or as a FQDN At 9002, the intermediate NF 902 determines whether the first NFp 903 is located in a HPLMN. The intermediate NF 902 may further determine, for the first NFp 903 whether the first second NFp 903 is configured to be able to receive, understand, and use both intra-PLMN and inter-PLMN addresses contemporaneously. In other words, the intermediate NF 902 determines whether the first NFp 903 is configured to support the enhanced address information described herein.

When the first NFp 903 and the second NFp 904 are configured to support the enhanced address information, the mechanism proceeds to 9003.

At 9003, the intermediate NF 902 signals a subscribe request to the NFp 903. This signalling may comprise the information provided in the signalling of 9001. In other words, this signalling may comprise a subscribe request that comprises a notification address/URI to where subscription notifications are to be delivered. This notification address may be accompanied by an indication that indicates whether the notification address is for an inter-PLMN addressing mechanism or for an intra-PLMN addressing mechanism. Assuming that the notification URI provided in the signalling of 9003 is for an intra-PLMN notification address, the signalling may further comprise an address for the Inter-PLMN NFc address. This address for the inter-PLMN address may be provided as a URI and/or as a FQDN.

At 9004, the first NFp 903 signals a service request to the second NFp 904. This service request may comprise the information received during 9003. In other words, this signalling may comprise a notification address/URI to where subscription notifications are to be delivered. This notification address may be accompanied by an indication that indicates whether the notification address is for an inter-PLMN addressing mechanism or for an intra-PLMN addressing mechanism. Assuming that the notification URI provided in the signalling of 9003 is for an intra-PLMN notification address, the signalling may further comprise an address for the Inter-PLMN NFc address. This address for the inter-PLMN address may be provided as a URI and/or as a FQDN. Similar to how the intermediate NF is described in the above examples as selecting relevant address information to signal to the first NFp, the first NFp may select which address information to signal to the second NFp. This means that the first NFp may be configured to retrieve profile information about the second NFp from the NRF. This profile information may indicate a location/PLMN with which the second NFp is located. This profile information may additionally comprise an indication of whether the second NFp is configured to receive both an inter-PLMN and and intra-PLMN address.

At 9005, the second NFp 904 determines which notification address to use, depending on the PLMN in which the NFc 901 is located and the PLMN in which the second NFp 904 is located. For example, when NFc 901 and second NFp 904 are located in different PLMNs, the inter-PLMN notification address is selected for sending subscription notifications to. Further, when NFc 901 and second NFp 904 are located in the same PLMN, the intra-PLMN notification is selected for sending subscription notifications to.

At 9006, the second NFp 904 signals a notification to the NFc 901 in accordance with the subscription established through the signalling of 9001 to 9005. This signalled notification is provided to the notification address selected at 9005.

When the first NFp 903 is configured to support the enhanced address information and the second NFp is not configured to support the enhanced address information, the mechanism proceeds to 9007.

At 9007, the intermediate NF 902 signals a subscribe request to the NFp 903. This signalling may comprise the information provided in the signalling of 9001. In other words, this signalling may comprise a subscribe request that comprises a notification address/URI to where subscription notifications are to be delivered. This notification address may be accompanied by an indication that indicates whether the notification address is for an inter-PLMN addressing mechanism or for an intra-PLMN addressing mechanism. Assuming that the notification URI provided in the signalling of 9003 is for an intra-PLMN notification address, the signalling may further comprise an address for the Inter-PLMN NFc address. This address for the inter-PLMN address may be provided as a URI and/or as a FQDN.

At 9008, the first NFp 903 signals the second NFp 904. This signalling may comprise a subscribe request address for signalling notifications to. The signalling may comprise a single notification address. The single notification address may be selected by the first NFp 903 in dependence on the relative locations of the NFc 901 and the second NFp 904. For example, when NFc 901 and the second NFp 904 are located in different PLMNs, the inter-PLMN notification address is selected for sending subscription notifications to. Further, when NFc 901 and the second NFp 904 are located in the same PLMN, the intra-PLMN notification is selected for sending subscription notifications to.

At 9009, the second NFp signals a notification to the NFc 901 using the address used during 9008.

Although not shown, it is understood that when the first NFp 903 is not configured to receive the enhanced/expanded address information in the above example of FIG. 9, that the intermediate NF 902 provides the first NFp 903 with a single notification address for the subscription, which may, in turn be passed on to the second NFp 904 regardless of whether or not the second NFp 904 is configured to receive and use the enhanced/expanded address information.

Figure 10:
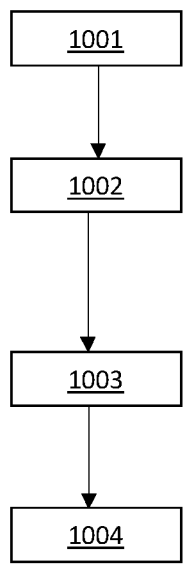
FIGS. 10 to 12 illustrate example operations that may be performed by apparatus described herein.
Figure 11:
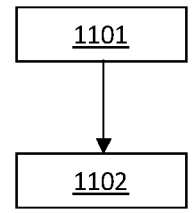
Figure 12:
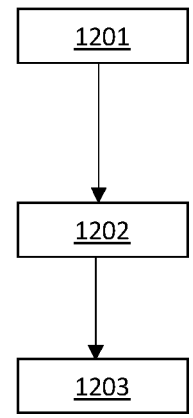

FIGS. 10 to 12 illustrate potential operations that may be performed by apparatus described herein, and highlight aspects of the above-discussed examples. It is therefore understood that features of the above may also be complementarily applied in the following examples.

FIG. 10 illustrates potential operations that may be performed by a network function. The network function may be, for example, an intermediate network function that mediates subscription requests between a service consumer and a service producer. The network function may be an intermediate network function such as described in the above examples. The network apparatus may be, for example, a unified data management function. The network apparatus may be, for example a data collection coordination function.

At 1001, the apparatus receives, from a service consumer, event subscription information comprising an intra-domain address and an inter-domain address for signalling event subscription notification information from a service producer to the service consumer. The service consumer may be as described below in relation to FIG. 11. The service consumer may be, for example, a network exposure function.

The event subscription information may indicate one of the intra-domain address and one of the inter-domain addresses as being nominated as an endpoint (e.g. an api-root) for receipt by the service consumer of subscription notifications associated with the subscription associated with the event subscription information. In other words, the event subscription information may indicate one of the provided addresses as being a notification URI. This may be indicated by the addresses' location in the event subscription information. The other address (i.e. the non-indicated address) may be provided in another location in the header and/or an information element of the event subscription information.

At 1002, the apparatus determines whether a first service producer is located in the same domain as the service consumer. In other words, the apparatus determines whether the service consumer is roaming relative to the first service producer.

At 1003, the apparatus selects at least one of the inter-domain address and the intra-domain address to signal to the first service producer in dependence on said determining. This selected address may be different to the address indicated in the event subscription information.

At 1004, the apparatus signals the selected at least one address to the first service producer. This signalling may indicate which of the selected addresses the service producer is to use to signal subscription notifications to service consumer.

Optionally, the apparatus may determine whether the first service producer is configured to receive both the intra-domain address and the inter-domain address. In other words, the apparatus may determine whether the first service producer is able to receive the enhanced address information.

When such a determining is performed, the apparatus may perform at least one operation in dependence on the result of the determining.

For example, the selecting of 1003 may comprise selecting both the inter-domain address and the intra-domain address for signaling to the first service producer when it is determined that the first service producer is configured to receive both the intra-domain address and the inter-domain address.

As another example, the selecting of 1003 may comprise selecting comprises one of the inter-domain address and the intra-domain address for signaling to the first service producer when it is determined that the first service producer is not configured to receive both the intra-domain address and the inter-domain address, wherein the intra-domain address is selected when it is determined that the first service producer is located in the same domain as the service consumer, and the inter-domain address is selected when it is determined that the first service producer is located in a different domain to the service consumer. This means that the signalling of 1004 may comprise only one of the intra-domain address and the inter-domain address received at 1001, with the other (non-selected) address not being signalled to the first service producer.

The selecting of 1003 may comprise selecting one of the inter-domain address and the intra-domain address as an endpoint for at least one event subscription notification from the service producer in dependence on whether the service consumer is in the same domain or a different domain to the first service consumer. The apparatus may signal both the inter-domain address and the intra-domain address for signaling to the first service producer, as well as signalling an indication of which of the inter-domain address and the intra-domain address has been selected as an endpoint.

The selecting of 1003 may comprise selecting one of the inter-domain address and the intra-domain address as an endpoint for at least one event subscription notification from the service producer in dependence on whether the service consumer is in the same domain or a different domain to the first service consumer. The apparatus may signal only the selected one of the inter-domain address and the intra-domain address to the first service producer in such a case.

As mentioned above, the received event subscription information may indicate one of the intra-domain address and the inter-domain address is to function as an endpoint for at least one event subscription notification for the service consumer. In such a case, the selecting may further comprise: determining that the received indicated endpoint address is incompatible with the relative domain locations of the first service producer and the service consumer; and, in response to said determining, overwriting the indicated endpoint address to instead indicate the other of said addresses. It is understood that references to "overwriting" throughout this specification refers to the operation of replacing a value for an indicated parameter with another value, such as replacing an intra-domain address with an inter-domain address for the parameter "notification address".

FIG. 11 illustrates potential operations that may be performed by an apparatus for a service consumer. The service consumer may be a network exposure function. The service consumer of FIG. 11 may interact with the apparatus of FIG. 10 and/or of FIG. 12.

At 1101, the apparatus signals, to a network function, event subscription information comprising an intra-domain address and an inter-domain address for signalling event subscription notification information from a service producer to the service consumer. The network function may be the network function of FIG. 10. The network function maybe the service producer, such as the service producer of FIG. 12.

At 1102, the apparatus receives, at least one of: an event subscription notification addressed from a first service producer in the same domain as the apparatus to the intra-domain address; and an event subscription notification addressed from a second service producer in a different domain than the apparatus to the inter-domain address.

FIG. 12 illustrates potential operations that may be performed by an apparatus for a first service producer. The first service producer may be the first service producer discussed above in relation to FIGS. 10 and/or 11. The first service producer may be an access and mobility function. The first service producer may be a session management function.

At 1201, the apparatus receives, from a network function, event subscription information comprising an intra-domain address and an inter-domain address for addressing event subscription notification information to a service consumer. The network function may be the intermediate network function discussed above in relation to FIG. 10. The network function may be the service consumer. For example, the network function may be the service consumer discussed above in relation to FIG. 11.

The event subscription information may indicate one of the intra-domain address and one of the inter-domain addresses as being nominated as an endpoint (e.g. an api-root) for receipt by the service consumer of subscription notifications associated with the subscription associated with the event subscription information. In other words, the event subscription information may indicate one of the provided addresses as being a notification URI. This may be indicated by the addresses' location in the event subscription information. The other address (i.e. the non-indicated address) may be provided in another location in the header and/or an information element of the event subscription information.

At 1202, the apparatus selects an address from the intra-domain address and the inter-domain address for addressing notification information to the service consumer, wherein the intra-domain address is selected when the first service producer is located in the same domain as the service consumer, and wherein the inter-domain address is selected when the first service producer is located in a different domain to the service consumer. This selected address may be different to the indicated address.

At 1203, the apparatus signals subscription notification information to the service consumer using the selected address.

The apparatus may determine that event subscription notification information for the service consumer is to be provided by a second service producer. In such a case, the apparatus may signal both the inter-domain address and the inter-domain address to the second service producer in response to said determining that event subscription notification information for the service consumer is to be provided by a second service producer.

The apparatus may determine that event subscription notification information for the service consumer is to be provided by a second service producer. The apparatus may further determine whether the second service producer is located in a same or a different domain as the service consumer. In response to this determining, the apparatus may select one of the inter-domain address and the inter-domain address to the second service producer, wherein the intra-domain address is selected when it is determined that the second service producer is located in the same domain as the service consumer, and the inter-domain address is selected when it is determined that the second service producer is located in a different domain to the service consumer. The apparatus may signal the selected address to the second service producer.

The apparatus may determine that event subscription notification information for the service consumer is to be provided by a second service producer. The apparatus may determine that the second service producer is able to receive both the intra-domain address and the inter-domain address. The apparatus may signal both the inter-domain address and the inter-domain address to the second service producer in response to said determining that the second service producer is able to receive both the intra-domain address and the inter-domain address.

The apparatus may determine that event subscription notification information for the service consumer is to be provided by a second service producer. The apparatus may determine that the second service producer is unable to receive both the intra-domain address and the inter-domain address. The apparatus may signal one of the inter-domain address and the inter-domain address to the second service producer in response to said determining that the second service producer is unable to receive both the intra-domain address and the inter-domain address, wherein the intra-domain address is signalled to the second service producer when the second service producer is determined to be located in the same domain as the service consumer, and wherein the inter-domain address is selected when the second service producer is determined to be located in a different domain to the service consumer.

The apparatus may determine that event subscription notification information for the service consumer is to be provided by a second service producer. The apparatus may determine that the second service producer is unable to receive both the intra-domain address and the inter-domain address. The apparatus may cancel the subscription associated with the event subscription notification information in response to said determining that the second service producer is unable to receive both the intra-domain address and the inter-domain address.

In all of the above examples of FIGS. 10 to 12, the received event subscription information may indicate one of the intra-domain address and the inter-domain address is to function as an endpoint for at least one event subscription notification for the service consumer. For the service producer apparatus of FIG. 12 and the network function apparatus of FIG. 10, the selecting may further comprise: determining that the received indicated endpoint address is incompatible with the relative domain locations of the second service producer and the service consumer; and, in response to said determining, overwriting the indicated endpoint address to instead indicate the other of said addresses.

In all of the above examples, the intra-domain address and/or the inter-domain address may be provided in a form of at least one of: an apiRoot, a Fully Qualified Domain Name, an Internet Protocol Address, and/or a Uniform Resource Indicator.

In all of the above examples, the intra-domain address may be an intra-Public Land Mobile Network address and the inter-domain address may be an inter-Public Land Mobile Network address. It is understood that PLMNs are a type of administrative domain, and that the presently described techniques may be applied to other types of administrative domains located in communication systems.

In all of the above examples of FIGS. 10 to 12, the event subscription information may indicate which of the intra-domain address and the inter-domain address is intended by the service consumer for use as an endpoint for receiving event subscription notification information. Further, the event subscription information may comprise an explicit indication as to whether the indicated endpoint address intended for use for receiving event subscription notification information is an intra-domain address or an inter-domain address. The indicated endpoint address may be an apiRoot address in a Hypertext Transfer Protocol notification or callback Uniform Resource Identifier.

Figure 2:
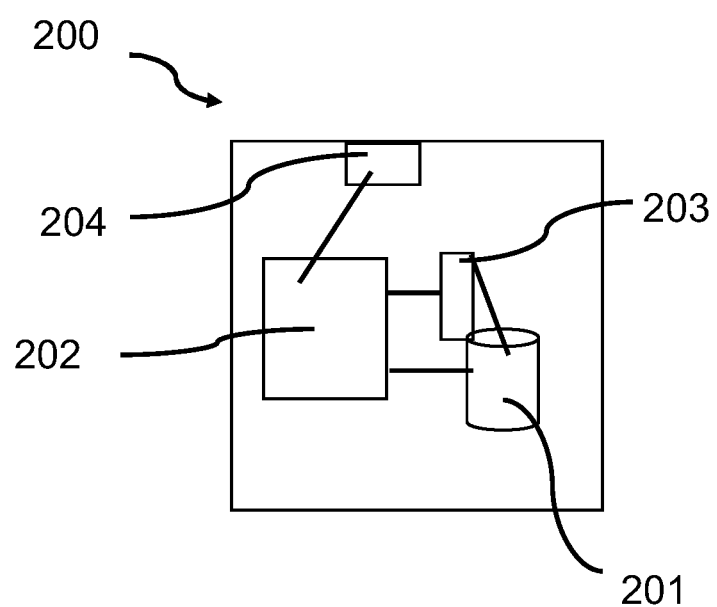
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
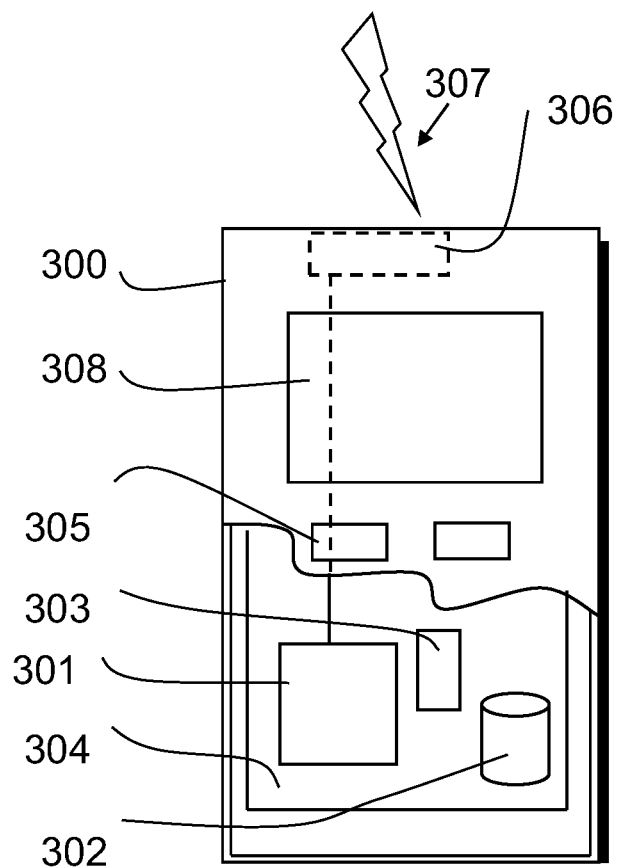
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
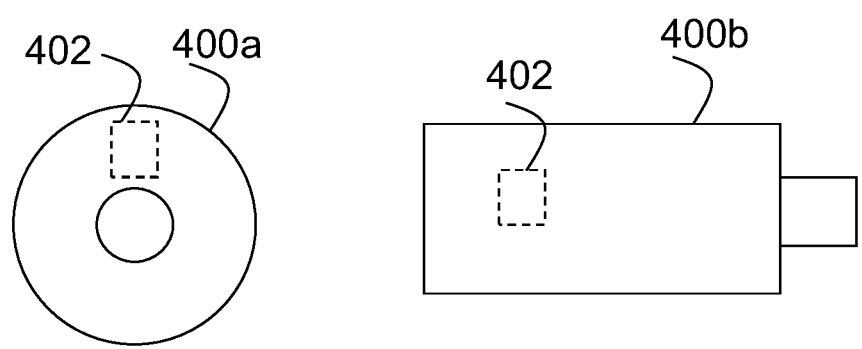
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 10 and/or FIG. 11, and/or FIG. 12.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10 and/or FIG. 11, and/or FIG. 12, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally, some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

In the above, different examples are described using, as an example of an access architecture to which the presently described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
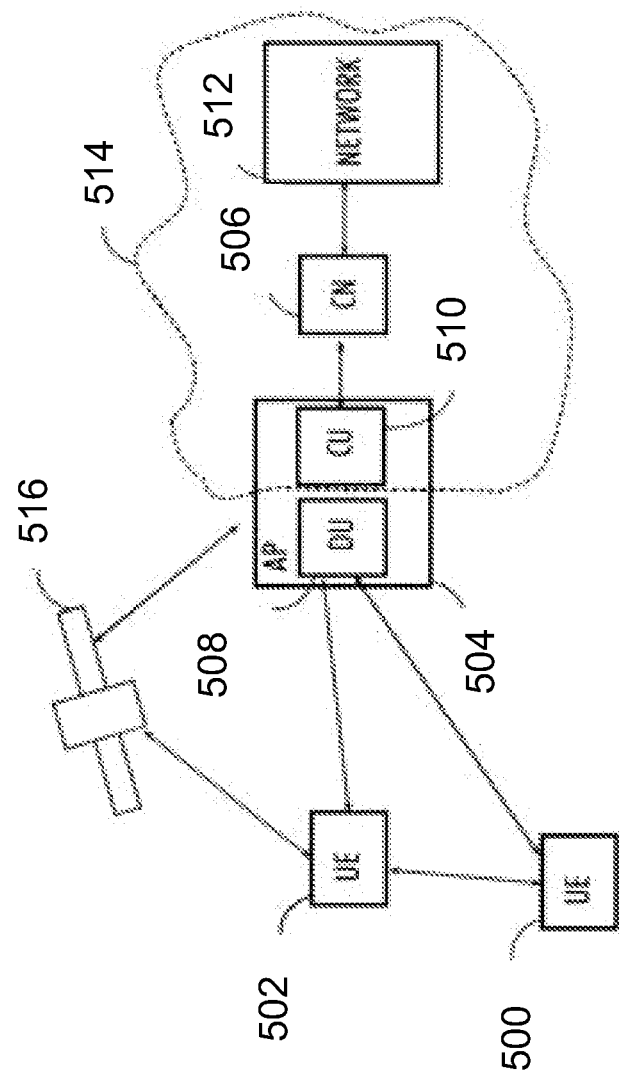
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input— multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

We claim:

1. An apparatus comprising:
   at least one processor; and
   at least one memory comprising computer code that, when executed by the at least one processor, causes the apparatus to perform:
   receiving, from a service consumer of a 3GPP system, event subscription information comprising an intra-public landline mobile network address and an inter-public landline mobile network address for signalling event subscription notification information from a service producer of the 3GPP system to the service consumer, wherein the received event subscription information indicates one of the intra-public landline mobile network address and the inter-public landline mobile network address is to function as an endpoint for at least one event subscription notification for the service consumer;

determining whether a first service producer is located in the same public landline mobile network as the service consumer;

selecting at least one of the inter-public landline mobile network address or the intra-public landline mobile network address to signal to the first service producer based on the determining, wherein the selecting further comprises:

determining that the received indicated endpoint address is incompatible with the relative public landline mobile network locations of the first service producer and the service consumer when (i) either the received indicated endpoint address is an intra-public landline mobile network address and the service consumer and the first service producer are in different public landline mobile networks, or (ii) the received indicated endpoint address is an inter-public landline mobile network address and the service consumer and the first service producer are in a same public landline mobile network, and in response to the determining, overwriting the indicated endpoint address to instead indicate the other of the addresses; and signalling the selected at least one address to the first service producer.

2. The apparatus as claimed in claim 1,
wherein the apparatus comprises computer code that, when executed by the at least one processor, causes the apparatus to perform:
determining whether the first service producer is configured to receive both the intra-public landline mobile network address and the inter-public landline mobile network address.

3. The apparatus as claimed in claim 2,
wherein selecting the at least one of the inter-public landline mobile network address or the intra-public landline mobile network address comprises:
selecting both the inter-public landline mobile network address and the intra-public landline mobile network address for signaling to the first service producer when it is determined that the first service producer is configured to receive both the intra-public landline mobile network address and the inter-public landline mobile network address.

4. The apparatus as claimed in claim 2,
wherein selecting the at least one of the inter-public landline mobile network address or the intra-public landline mobile network address comprises:
selecting one of the inter-public landline mobile network address and the intra-public landline mobile network address for signaling to the first service producer when it is determined that the first service producer is not configured to receive both the intra-public landline mobile network address and the inter-public landline mobile network address,
wherein the intra-public landline mobile network address is selected when it is determined that the first service producer is located in the same domain as the service consumer, and
wherein the inter-public landline mobile network address is selected when it is determined that the first service producer is located in a different domain to the service consumer.

5. The apparatus as claimed in claim 1,
wherein selecting the at least one of the inter-public landline mobile network address or the intra-public landline mobile network address comprises:
selecting one of the inter-public landline mobile network address or the intra-public landline mobile network address as an endpoint for at least one event subscription notification from the service producer based on whether the service consumer is in the same domain or a different domain to the first service consumer; and
wherein signalling the selected at least one address comprises:
signalling both the inter-public landline mobile network address and the intra-public landline mobile network address for signaling to the first service producer; and
signalling an indication of which of the inter-public landline mobile network address and the intra-public landline mobile network address has been selected as an endpoint.

6. The apparatus as claimed in claim 1,
wherein selecting the at least one of the inter-public landline mobile network address or the intra-public landline mobile network address comprises:
selecting one of the inter-public landline mobile network address and the intra-public landline mobile network address as an endpoint for at least one event subscription notification from the service producer in dependence on whether the service consumer is in the same public landline mobile network or a different public landline mobile network to the first service consumer; and
wherein signalling the selected at least one address comprises:
signalling only the selected one of the inter-public landline mobile network address and the intra-public landline mobile network address to the first service producer.

7. The apparatus as claimed in claim 1,
wherein the apparatus is configured to function as at least one of a unified data management function or a data collection coordination function.

8. An apparatus of a first service producer of a 3GPP system, the apparatus comprising:
at least one processor; and
at least one memory comprising computer code that, when executed by the at least one processor, causes the apparatus to perform:
receiving, from a network function of the 3GPP system, event subscription information comprising an intra-public landline mobile network address and an inter-public landline mobile network address for addressing event subscription notification information to a service consumer of the 3GPP system;
selecting an address from the intra-public landline mobile network address and the inter-public landline mobile network address for addressing notification information to the service consumer,
wherein the intra-public landline mobile network address is selected when the first service producer is located in the same domain as the service consumer, and
wherein the inter-public landline mobile network address is selected when the first service producer is located in a different domain to the service consumer; and
signalling notification information to the service consumer using the selected address.

9. The apparatus as claimed in claim 8,
wherein the apparatus comprises computer code that, when executed by the at least one processor, causes the apparatus to perform:

determining that event subscription notification information for the service consumer is to be provided by a second service producer; and signalling both the intra-public landline mobile network address and the inter-public landline mobile network address to the second service producer based on the determining that event subscription notification information for the service consumer is to be provided by a second service producer.

10. The apparatus as claimed in claim 8, wherein the apparatus comprises computer code that, when executed by the at least one processor, causes the apparatus to perform:

determining that event subscription notification information for the service consumer is to be provided by a second service producer;

determining whether the second service producer is located in a same or a different domain as the service consumer;

selecting one of the intra-public landline mobile network address and the inter-public landline mobile network address to the second service producer based on the determining whether the second service producer is located in a same or a different domain as the service consumer, wherein the intra-public landline mobile network address is selected when it is determined that the second service producer is located in the same domain as the service consumer, and wherein the inter-public landline mobile network address is selected when it is determined that the second service producer is located in a different domain to the service consumer; and signalling the selected address to the second service producer.

11. The apparatus as claimed in claim 8, wherein the first service producer is an access and mobility function and/or a session management function.

12. The apparatus as claimed in claim 8, wherein the intra-public landline mobile network address is provided in a form of at least one of: an apiRoot, a Fully Qualified Domain Name, an Internet Protocol Address, or a Uniform Resource Indicator.

13. The apparatus as claimed in claim 8, wherein the inter-public landline mobile network address is provided in a form of at least one of: an apiRoot, a Fully Qualified Domain Name, an Internet Protocol Address, or a Uniform Resource Indicator.

* * * * *